United States Patent [19]

Haddock et al.

[11] Patent Number: 4,912,880
[45] Date of Patent: Apr. 3, 1990

[54] COMPUTERIZED TRACING/EDGING SYSTEM

[75] Inventors: Fred A. Haddock; Kimber W. Rarick, both of Muskogee, Okla.

[73] Assignee: Cobain Optical Industries, Inc., Muskogee, Okla.

[21] Appl. No.: 157,160

[22] Filed: Feb. 11, 1988

Related U.S. Application Data

[63] Continuation of Ser. No. 805,516, Dec. 6, 1985, abandoned.

[51] Int. Cl.$^4$ ................................................. B24B 7/00
[52] U.S. Cl. ............................. 51/101 LG; 51/165.71; 51/105 EC; 51/284 E
[58] Field of Search ......... 51/101 LG, 101 R, 165.71, 51/284 E, 97 NC, 105 EC

[56] References Cited

U.S. PATENT DOCUMENTS

| | | | |
|---|---|---|---|
| 4,096,884 | 6/1978 | Akaba et al. | 51/101 LG |
| 4,557,076 | 12/1985 | Helbrecht | 51/101 LG |
| 4,656,590 | 4/1987 | Ace | 51/101 LG |

*Primary Examiner*—Frederick R. Schmidt
*Assistant Examiner*—Maurina Rachuba
*Attorney, Agent, or Firm*—Bradford E. Kile

[57] ABSTRACT

A computerized tracing/edging system for the edging of an ophthalmic lens comprises a tracing sub-system for performing a tracing operation with respect to a frame, a pattern or a lens to derive data relating to the dimensions thereof, a storing sub-system for storing the data relating to the dimensions of the traced frame, pattern or lens, and an edging sub-system responsive to the data relating to the dimensions of the traced frame, pattern or lens for edging the ophthalmic lens so as to provide it with dimensions corresponding to the dimensions of the traced frame, pattern or lens. The computerized tracing/edging system can be implemented as a multi-processor system consisting of a first sub-system for performing the tracing operations, a second sub-system for performing the storage operations (as well as data translation procedures for converting the data from one form to another), and a third sub-system for performing the edging operations. Alternatively, the tracing or edging sub-systems can be implemented as single, stand-alone systems having the capabilities described above. The tracing sub-system employs a data sensor to convert traced dimensions to electrical signals, the same data sensor being employed in any of the modes of operation (frame tracing, lens tracing or pattern tracing).

43 Claims, 11 Drawing Sheets

COMPUTERIZED TRACING/EDGING SYSTEM

This application is a continuation of application Ser. No. 805,516, filed Dec. 6, 1985, now abandoned.

TECHNICAL FIELD

The present invention generally relates to a computerized tracing/edging system, and more particularly to a computerized system for tracing the dimensions of a frame, a template or pattern, or a lens, and for edging ophthalmic lenses in accordance with the traced dimensions.

BACKGROUND ART

In the normal course of processing a lens or pair of lenses, many techniques may be utilized to reach the stage of processing where the lens must be edged to shape so that it can be mounted in the spectacle frame. Specifically, a lens may be a semi-finished lens, that is, a lens having one surface finished, so that a laboratory procedure is needed to finish the second side of the lens in order to complete the required refracting corrections required by the patient's prescription. Alternatively, the lens may be an uncut lens, that is, a lens having both sides completed by a lens manufacturer or supplier. In either case, the lens reaches the stage in its processing where it is ready for the edge-shaping process to take place.

In accordance with prior art techniques, normally, an edger requires a template or pattern to govern how the lens material will be configured to the exact shape necessary in order that it be mountable in a spectacle frame. In this regard, the laboratory technician needs to first locate the pattern from some pattern source. In a number of cases, this amounts to manually searching through a maze of patterns hung on a peg-board. Once found, the pattern is placed in a job tray and proceeds to an edging station. At the edging station, the edger operator must install the pattern on the edging machine, making sure that the lens is not reversed or edged bottom side up. Thus, a certain amount of skill and experience is required to make sure that the end results meet the requirements of the prescription. Once the edging is completed, the pattern must then be returned to its proper storage location.

In implementing the prior art technique described above, if two, three, four or even more jobs are processed on the same day, and if the jobs require the same configuration, then obviously the storage capacity of the individual patterns must be enhanced in order to cover the operations needed. This is due to the fact that, in such a busy operation, the same pattern may be needed at different edging stations at the same time. In addition, in such a prior art type operation, patterns must be checked frequently for wear, smoothness of contour, and the like, since the rigors of use in a busy operation ultimately result in wear and tear on the pattern.

In an effort to overcome the aforementioned problems, prior art practitioners have developed various methods and systems for automatic grinding or edging of lenses. However, such systems have been characterized by various disadvantages, principal of which are inaccuracy, lack of precision, and over-dependence on mechanical techniques (that is, failure to take advantage of modern technology). For example, U.S. Pat. No. 4,217,736—Akaba et al discloses a method for automatically grinding a lens wherein an automatic lens grinding machine employs a recording assembly which, in a first step, records the pattern of a spectacle frame on a heat-sensitive or photo-sensitive substrate, and which, in a second step, employs a scanner assembly and a control circuit to grind the lens automatically in accordance with scanning of the information recorded on the heat-sensitive or photo-sensitive substrate. As mentioned above, such an automatic lens grinding machine is plagued by the disadvantages of lack of precision and too much dependence on mechanical (in this case, recording and optical scanning) techniques.

Other prior art techniques and systems are disclosed in the following U.S. Pat. Nos.: 3,482,357; 3,564,776; 3,913,274; 3,121,979; 3,672,855; and 4,027,434. In addition, see German Auslegeschrift 1,207,235.

DISCLOSURE OF INVENTION

The present invention generally relates to a computerized tracing/edging system, and more particularly to a computerized system which traces the dimensions of a frame, a template or pattern, or a lens, and which edges an ophthalmic lens in accordance with the traced dimensions.

The system of the present invention comprises three sub-systems which are capable of independent operation, but which can be used in combination to achieve a comprehensive system operation. Sub-system I, which can be called a tracer control system, serves to collect information relating to the dimensions of a frame into which a lens is to be inserted, a template or pattern in accordance with which a lens is to be fabricated, or a lens which is to be duplicated or matched. Sub-system II, which can be called a supervisor computer or a storing/translating system, serves to perform data storage and/or data processing (e.g., translation) with respect to the data collected by sub-system I. Sub-system III, which can be called an edger control system, receives and responds to data collected by sub-system I and stored by sub-system II so as to generate control signals for controlling the components of an edger machine, resulting in the grinding or edging of a lens having those characteristics or dimensions necessary for the lens to fit within a spectacle frame or to correspond to a pattern or template, or a matching lens.

As a result of implementation of the present invention, most of the problems encountered with prior art techniques disappear. Sub-system I of the present invention provides the user with flexibility in operation in that data relating to the dimensions of a lens can be collected as a result of a tracing operation conducted with respect to a frame, a template or pattern, or another lens. Further flexibility is provided in that sub-system I can produce data in "point-contact form" (that is, suitable for processing by an external computation device) or in "wheel form" (that is, suitable for controlling an edging machine).

By means of the present invention, data collected by sub-system I is stored electronically, in sub-system II, either in magnetic media or in solid-state media. Since such stored shape data can be electronically retrieved whenever needed for lens edging operations, speed in accessing pattern data is achieved, and the disadvantage of wear and tear on lens patterns or templates is avoided. A further disadvantage of the prior art is eliminated by the present invention in that access to electronically stored shaped data can be carried out by a large number of edging stations, even if two or more edging stations require the same shape data at the same time. A further savings in time is experienced by implementation of the present invention in that, after an edging operation is completed, it is not necessary, as in the prior art methods and systems, to return a pattern to a pattern storage location.

Furthermore, by virtue of the storage of shape data in sub-system II of the present invention, translation of point-contact data to wheel form data can be carried out. Such a translation technique is carried out by a processor of sub-system II, and thus the translation operations do not interfere with data collection carried out by sub-system I or edger operations carried out under the control of sub-system III. In addition, the design of sub-system II is such that shape data can be down-loaded from a mainframe computer in ASCII form, with subsequent translation of the ASCII data to "raw data" (e.g., hexadecimal) form taking place in the processor of sub-system II.

Sub-system III is an edger control sub-system capable of either stand-alone operation or operation as a part of a system including previously discussed sub-systems I and II. In the stand-alone mode of operation, sub-system III is capable of deriving edging data from a pattern or template positioned in the edger machine associated with sub-system III. When sub-system III is employed as a part of the overall system, it receives lens, frame or pattern data from sub-system II, and uses that data to generate control signals for controlling, via a servo-type system, the edging machine associated therewith so as to form a lens in a shape corresponding to the data received. Moreover, by virtue of the fact that sub-system III has its own processor, it is capable of inverting data electrically (by well-known calculation methods) to form inverted data; in this manner, data referring to one lens (such as a left lens) can be inverted so as to provide data for the creation of a second lens (a right lens) matching the first.

By way of elaboration, it should be noted that, while sub-system III has the ability, in a stand-alone mode, to collect information directly from a pattern to control the edger servo system for generating lens shape and size, sub-system III also has internal memory for the purpose of storing this information for future use. Further, if sub-system III is not operating in the stand-alone mode, this information can be down-loaded to sub-system II for storage in its memory. The pattern is traced by keying in the pattern reference number which was assigned to the pattern information when it was first entered into the system. If this pattern information is stored in the stand-alone system (sub-system III in the stand-alone mode), the information is available only to the edger belonging to the system where it is stored. If the pattern information is down-loaded to sub-system II, then the information is available to all edging sub-systems (sub-system III's) within the total system.

In practical applications, sub-system I could be used independently to provide data for lens optimization calculations. This data would be collected in point-contact form and sent to a mainframe computer, to an Rx computer, or to a personal computer, wherein optimization calculations would take place. Sub-system I collects data from one of three sources: a finished lens, a pattern, or a frame. Sub-system I is capable of providing data in either point-contact form or edger wheel form. However, when sub-system I is used independently, it would not have to provide edger wheel form data because this form is useful only in sub-system III (the edging sub-system).

As mentioned above, sub-system III can operate independently to collect data only from patterns, to store the data in its own internal memory, and to control the edger for grinding the lens to a predetermined size and shape. Of course, both a left and a right lens can be generated from a single set of data. When pattern information is collected at sub-system III, the data are always in edger wheel form. Point-contact form data are useless for edger control.

Sub-system II can receive data from sub-system I (the tracing sub-system), and can also receive data from a mainframe computer or from an Rx computer. Such data can be in point-contact form or edger wheel form and, when necessary, sub-system II provides conversion from point-contact form to edger wheel form. Sub-system II can also receive data from sub-system III, but such data are always in edger wheel form. Data received by sub-system II are stored therein for future use, and are retrieved by keying in a pattern number which was assigned to the pattern when the data were first entered into the system. There are several independent conversion and storage applications for sub-system II. However, the primary function of sub-system II is to provide data to sub-system III.

Finally, it should be noted that sub-system II (the supervisor or data storage/translation computer) can be replaced by a mainframe, Rx or personal computer, with which sub-system I and/or III would communicate in stand-alone modes of operation.

Therefore, it is a primary object of the present invention to provide a computerized tracing/edging system for tracing a frame, pattern or lens to edge an ophthalmic lens.

It is an additional object of the present invention to provide a computerized edging system having three sub-systems operating independently or dependently as a part of a total system operation.

It is an additional object of the present invention to provide a computerized edging system having a flexible operation such that pattern or shape data can be collected by means of a tracing operation carried out with respect to a frame, a template or pattern, or an unmounted lens.

It is an additional object of the present invention to provide a computerized edging system wherein data can be collected or obtained either in point-contact form or wheel form.

It is an additional object of the present invention to provide a computerized edging system wherein pattern or shape data can be stored electronically, either in a magnetic media or in a solid-state media.

It is an additional object of the present invention to provide a computerized edging system wherein data can be translated from one form to another, such as from point-contact form to wheel form.

It is an additional object of the present invention to provide a computerized edging system which can operate in communication with a mainframe computer from which pattern or shape data can be down-loaded.

It is an additional object of the present invention to provide a computerized edging system wherein pattern or shape data collected or obtained by a sub-system is utilized by a further sub-system to control an edging machine so as to form a lens in a shape corresponding to the pattern or shape data collected or obtained by the first sub-system.

The above and other objects that will hereinafter appear, and the nature of the invention, will be more clearly understood by reference to the following description, the appended claims, and the accompanying drawings.

BEST MODE FOR CARRYING OUT THE INVENTION

Figure 1:
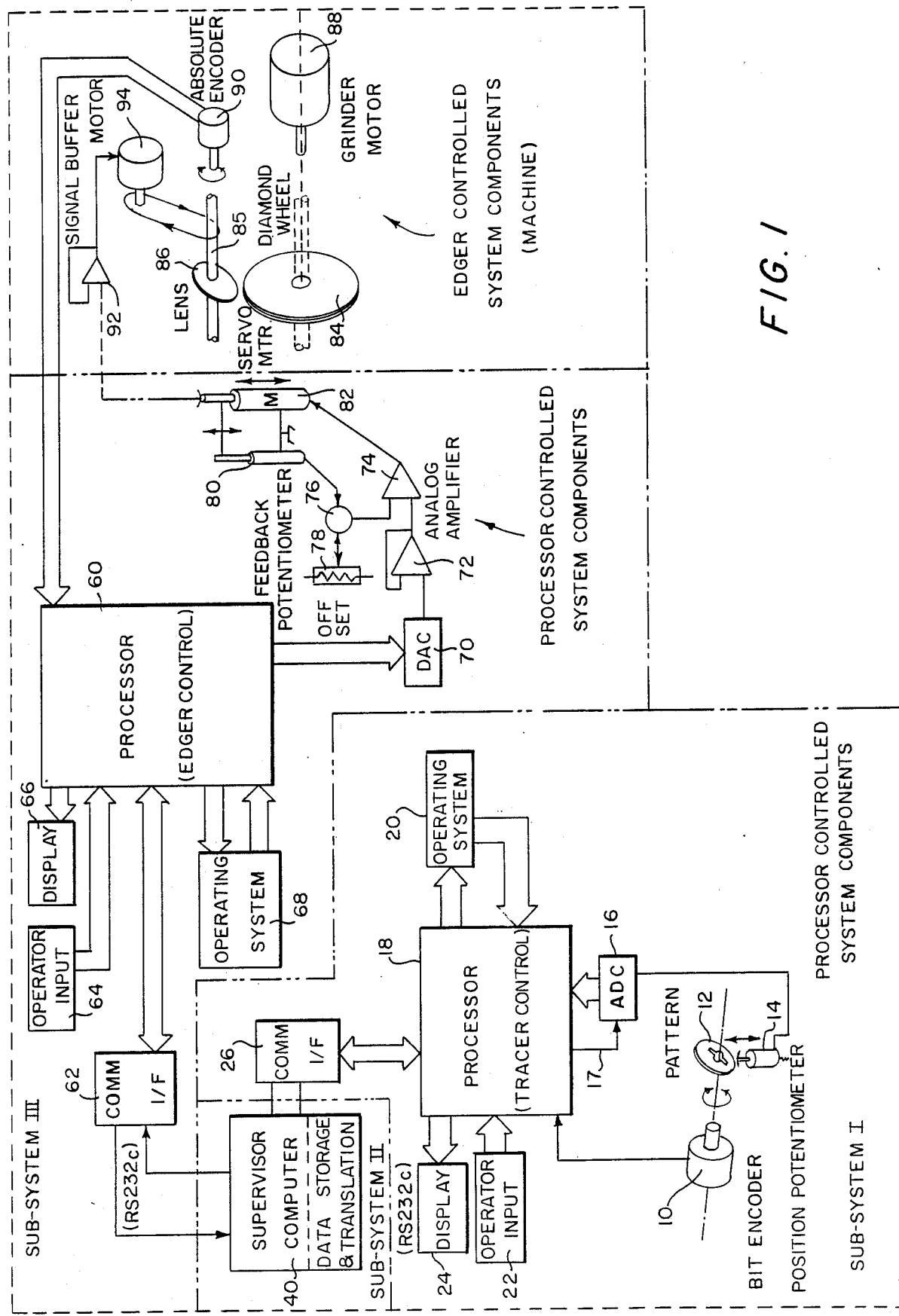
FIG. 1 is a block diagram of the computerized edging system of the present invention including sub-systems I, II and III and edger components.

FIG. 1 is a block diagram of the computerized edging system of the present invention. As seen therein, the system of the present invention basically comprises three sub-systems: sub-system I, sub-system II and sub-system III.

Sub-system I comprises a bit encoder 10 and a position potentiometer 14, as shown (by way of example) associated with a lens pattern 12, and further comprises an analog-to-digital converter (ADC) 16, a tracer control processor 18, an operating system 20, an operator input device 22, a display unit 24, and a communications interface 26.

In operation, sub-system I generates shape data from either a frame, a template or pattern, or an unmounted lens. FIG. 1 shows a pattern 12 in a "tracing" position, but it is to be understood that, as described in more detail below, the same principles apply to tracing operations performed with respect to a frame or an unmounted lens. In one embodiment (initially designed), a spindle motor (not shown in this figure) drives either a frame assembly, a pattern 12, or a lens for approximately two revolutions so as to insure that the data starts from a fixed data point each time. In a further, preferred embodiment (subsequently designed), the spindle is reversed just past the zero index, and is then rotated fully one turn, thus ensuring data integrity and eliminating about one-half of the original cycle time.

A rotary bit encoder 10 (which, as discussed below with reference to FIG. 6A, rotates in unison with the motor) generates a signal output which is transmitted to processor 18, and which signals processor 18 when data collection should start. The data sensor associated with the frame, pattern 12, or the lens may be either a linear digital encoder or an analog device. In the example shown in FIG. 1, the data sensor is a position potentiometer 14 which generates an analog output signal having a magnitude which varies in accordance with the radial dimensions of the pattern 12. The analog output signal is converted to digital form in ADC 16, and the resulting digital data are provided to processor 18. The sampling and converting operations of the ADC 16 are controlled by processor 18 via control line 17.

To describe this arrangement in more detail, encoder 10 operates in such a manner as to define a predetermined number of (for example, 128) distinct points around the 360° perimeter of a lens, pattern or frame. Thus, for 128 distinct points, data is collected every 2.8125° by ADC 16, as controlled via line 17 by processor 18, which in turn is responsive to the output provided by encoder 10.

It is to be understood that processor 18 is any standard data processor or digital computer, operating under the control of operating system 20, capable of receiving operator inputs via any operator input device 22 (such as a keyboard), and further capable of providing an output for display on a display unit 24. Furthermore, processor 18 is, preferably, capable of enhancing the data collected via ADC 16 by means of conventional processing; for example, linear piece-wise interpolation can be used to insert additional data between the collected data samples so that a "smoothing" of the collected data is obtained. In this manner, distinct positional movements in tracing the original lens or pattern are not detected in the final edged lens.

During data collection by sub-system I, each lens, frame or pattern is assigned a numerical address in memory by means of an operator input via device 22 so that, in the recording mode, processor 18 of sub-system I internally stores, at respective addresses, the shape data corresponding to the various patterns or lenses. Then, when desired by the operator, the processor 18 can be actuated to transmit the stored data, via communications interface 26, to either sub-system II or any mainframe computer, or even to a peripheral storage device, such as a tape recorder. Communications interface 26 is a conventional, RS-232 type interface. Data are transmitted through the interface 26 to the supervisor computer 40 (or to a mainframe) in ASCII form. The data format for tape storage, used primarily for back-up in small systems, is hexadecimal so that conversion from ASCII to hexadecimal is required prior to such storage. The data format for sub-system II is also hexadecimal so that conversion from ASCII is also required. Data storage is accomplished with solid-state memory or floppy disk in sub-system II, and can be accomplished with hard disk or bubble memory, or other similar means.

As stated earlier, sub-system I may be configured to generate shape data in either point-contact form or in wheel form. In this regard, and for the purpose of further explaining the operation of sub-system I, attention is directed to FIG. 2, which is a perspective view of a spectacle frame held in position by a frame holder mounted on a staging platform.

Figure 2:
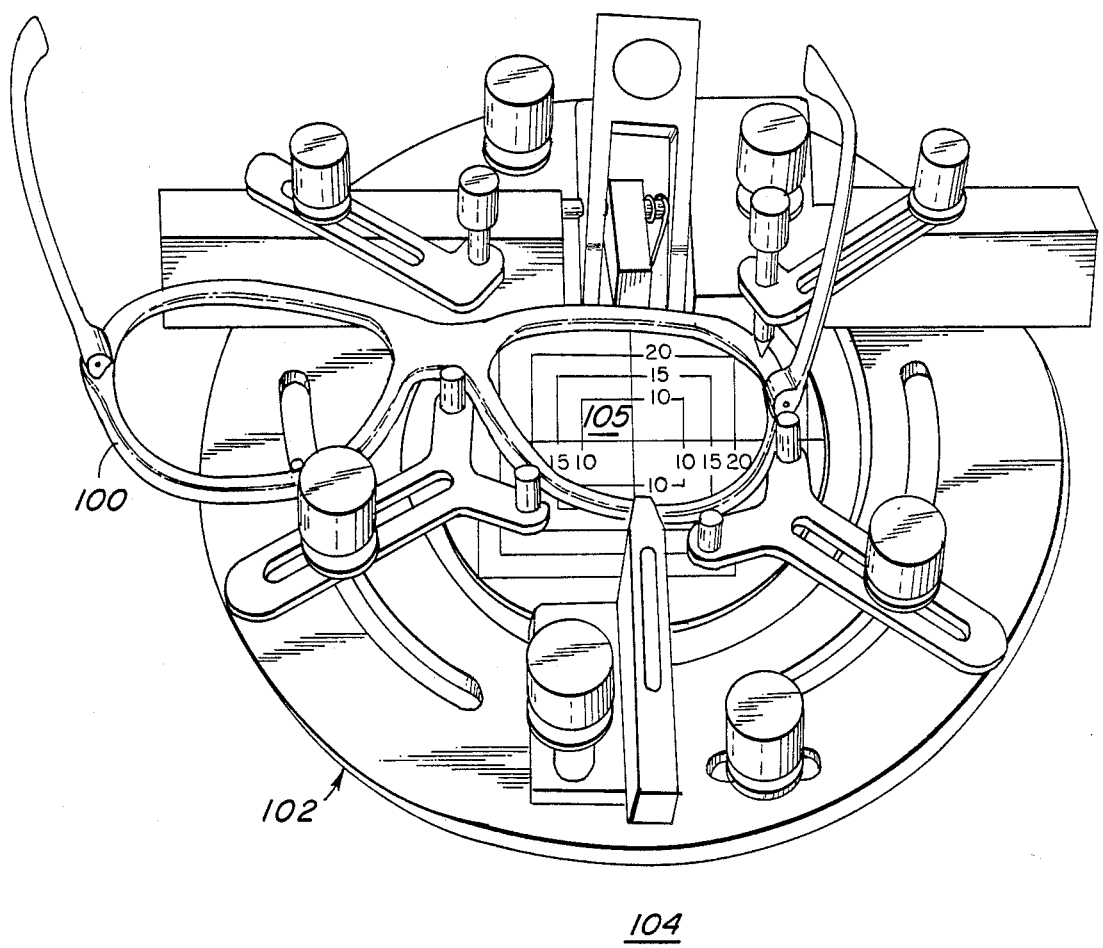
FIG. 2 is a perspective view of a frame holder holding a spectacle frame, the holder being positioned on a staging platform in sub-system I.

Referring to FIG. 2, in operation, when it is desired to collect shape data by performing a tracing operation with respect to a spectacle frame, the spectacle frame 100 is mounted on a frame holder 102, and the frame holder 102 is positioned on a staging platform 104. By appropriate adjustment, the lens opening of interest in spectacle frame 100 is mechanically centered with respect to the A-box and B-box dimensions (reference numeral 105) inscribed on staging platform 104. Only approximate mechanical centering is needed, since processor 18 of sub-system I automatically performs "mathematical" centering (through calculation routines built into the software) of the data after it is collected and before it is transferred to any other sub-system or part of the system. Once mechanical centering is accomplished, frame holder 102 is moved to a tracing position.

Figure 3:
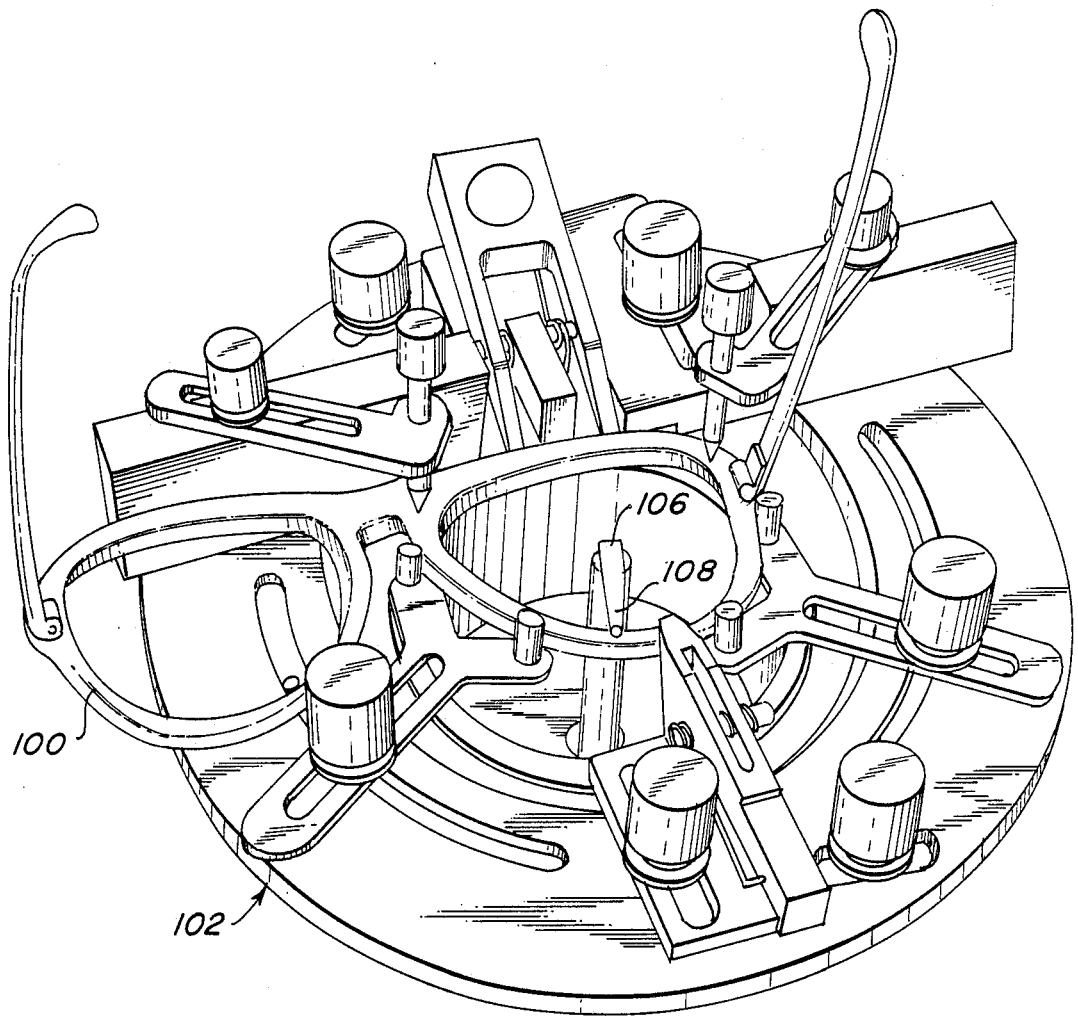
FIG. 3 is a perspective view of a frame holder holding a spectacle frame, the frame holder being disposed in a tracing position in sub-system I.

FIG. 3 is a perspective view of a spectacle frame mounted on a frame holder, as located in a tracing position. Specifically, frame holder 102 is positioned in such a manner that the lens opening of interest in spectacle frame 100 is approximately centered with respect to a stylus post 106 extending up through the center of the frame holder 102. Stylus post 106 is equipped with a pin arm or stylus 108 extending radially toward a groove in the eyewire of the frame 100. A more detailed view of this arrangement is provided in FIG. 6A (discussed below).

Stylus post 106 and stylus 108 can be provided with a cam knob (not shown) so that, once the stylus 108 is placed in the groove of the eyewire of the frame 100, the cam knob can be rotated to release the stylus 108 so that it exerts just enough pressure in the radial direction to hold itself in the groove of the frame 100.

At this point in the process, a pattern storage address or location number is entered into processor 18 via operator input device 22 (FIG. 1), and a start button (also provided on operator input device 22) is depressed.

Figure 6A:
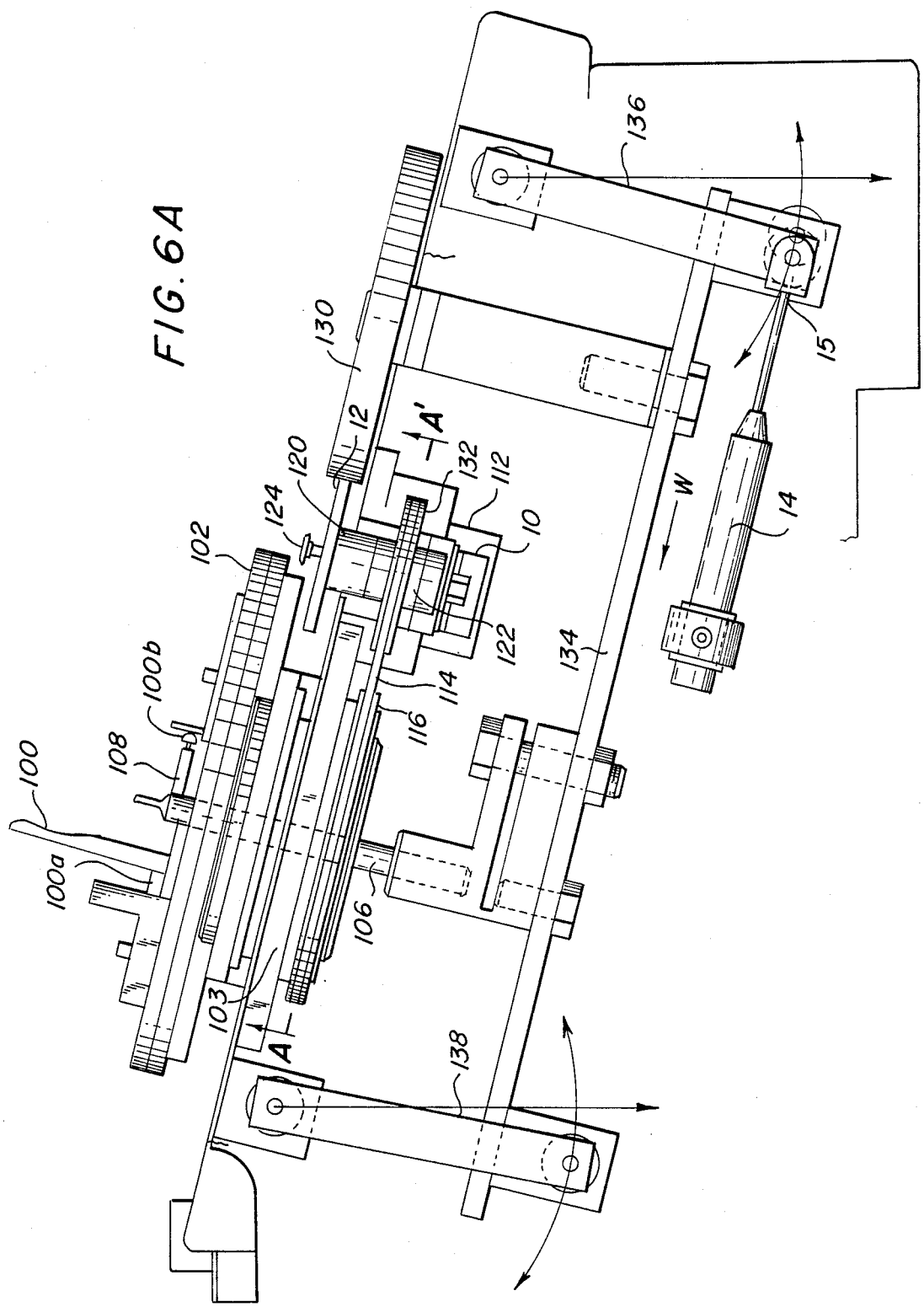
FIG. 6A is an elevation view of various mechanical and electrical components of a first sub-system (sub-system I) of the present invention.
Figure 6B:
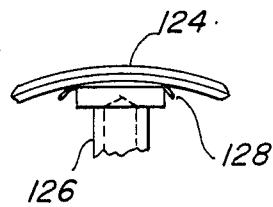
FIG. 6B is a more detailed view of a lens positioned on a lens adapter of the arrangement of FIG. 6A.
Figure 7:
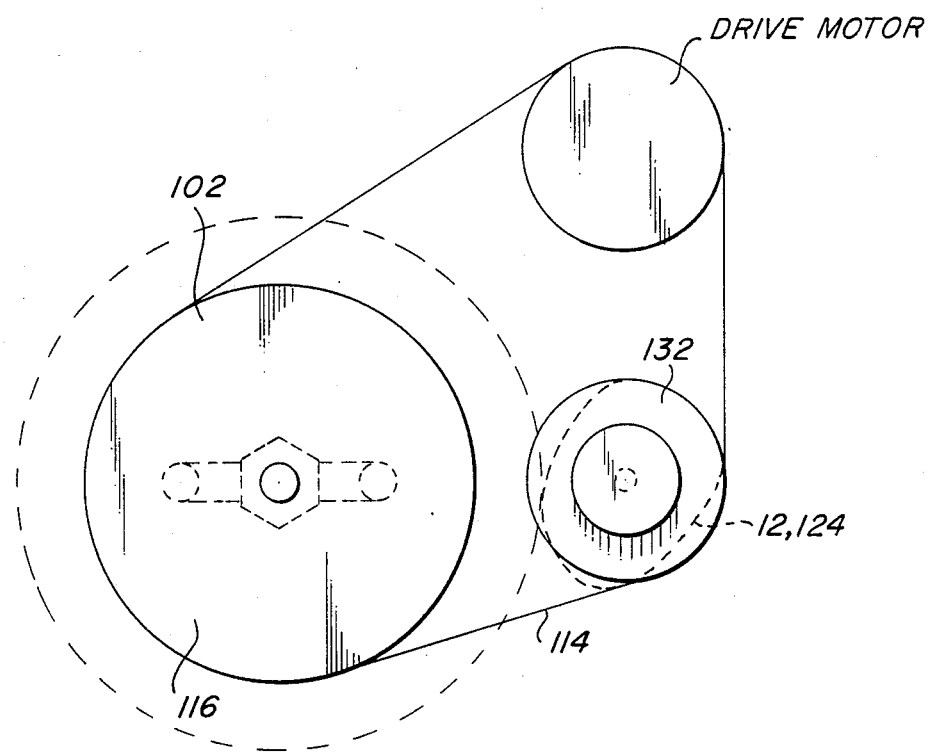
FIG. 7 is a sectional view, taken along line A—A', of a portion of the arrangement of FIG. 6A.

Reference is now made to FIG. 6A, which is an elevation view of various mechanical and electrical components of sub-system I, to FIG. 6B, which is a more detailed view of the lens arrangement of FIG. 6A, and to FIG. 7, which is a sectional view of a portion of FIG. 6A. Frame holder 102 is seen mounted on the arrangement of FIG. 6A in such a manner that stylus post 106 extends vertically through the center of frame holder 102 and underlying frame spindle 103. Stylus 108 extends from stylus post 106 toward a groove in cross-sectional portions 100a and 100b of spectacle frame 100. Stylus post 106 is supported by a tracer support post 110.

Frame 100 is mounted on frame holder 102, which is connected to and rotatably engaged by frame spindle 103, which is in turn connected to and rotatably engaged by driving tracer wheel 116. Referring to FIG. 7, tracer wheel 116 and pulley wheel 132 are driven by belt 114 which, in turn, is driven by motor 112. Thus, once the start button on operator input device 22 (FIG. 1) is actuated, motor 112 (FIG. 7) starts to rotate, moving belt 114 so as to rotate the wheel 116, resulting in rotation of frame holder 102 and frame 100 (FIG. 6A), with consequent relative movement of stylus 108 along the groove in frame 100.

Encoder 10 is a conventional rotary encoder mounted on the housing of pattern spindle 122 and disposed coaxially with respect to pattern spindle 122 (on which an optical disk is disposed) so that, as motor 112 rotates, encoder 10 provides to processor 18 a signal indicating the rotational position of both frame spindle 103 and pattern spindle 122 at predetermined points in time during the rotational cycle. In the frame tracing process, encoder 10 notifies processor 18 when a zero or starting position is reached, at which point analog data corresponding to the lens opening being traced, via relative movement of stylus 108 (FIG. 6A) in the groove of spectacle frame 100, are sampled by ADC 16 (FIG. 1). Corresponding digital data are provided to processor 18 for storage in the internal or operating memory thereof.

Further referring to FIG. 6A, analog data relating to the shape of the lens opening in spectacle frame 100 are derived merely by providing a data sensor 14. Although a linear or rotary potentiometer can be used to implement the data sensor, preferably data sensor 14 is implemented by a linear potentiometer, as shown in FIG. 6A. In general terms, data sensor 14 yields an output voltage proportional to the distance from the axial center of stylus post 106 to the end of stylus 108 as it is seated in the groove of portions 100a and 100b of frame 100. As frame 100 rotates about stylus 108, two data collection operations take place: encoder 10 provides to processor 18 (FIG. 1) information indicating the rotational position of frame spindle 103, and thus the relative rotational position of stylus 108, as the stylus 108 traces the groove of portions 100a and 100b of frame 100; and, at the same time, the data sensor 14 provides, via ADC 16 (FIG. 1), to processor 18 information relative to the lateral displacement of stylus post 106 as the stylus 108 traces the groove of portions 100a and 100b of frame 100, thus providing to processor 18 data corresponding to the dimensions of frame 100 as traced by stylus 108.

In the preferred embodiment of the arrangement of FIG. 6A, the linear potentiometer 14, frame 100 and frame holder 102 are fixed to the framework of the machine or system, while the stylus 108 and stylus post 106 are fixed to the moveable swingframe (or sub-table) 134. Thus, displacement of the stylus 108 as it traces the inner dimensions of the frame 100 causes lateral displacement of stylus post 106 and resultant displacement of swingframe 134. This, in turn, causes displacement of support arms 136 and 138, so that the slider 15 associated with potentiometer 14 is also laterally displaced. In this manner, potentiometer 14 provides, on a continuing basis, an analog voltage signal indicating the relative position and/or displacement of stylus 108 and stylus post 106. This analog voltage signal, once converted to digital form in ADC 16 (FIG. 1), is provided to processor 18. At the same time, processor 18 is receiving, from encoder 10 (FIG. 6A), input data indicating the relative rotational position of the stylus 108. Synchronization of the functions of encoder 10 and potentiometer 14 are achieved under software control, that is, as a result of program-controlled processing of the two sets of input data being received from those devices.

In an alternative embodiment of the arrangement of FIG. 6A, a rotary potentiometer can be provided for collecting data relative to the displacement of stylus 108 and stylus post 106. However, such an arrangement is less advantageous than the linear potentiometer arrangement previously discussed. This is due to the fact that the rotary potentiometer arrangement requires that a gear and track be provided in order to convert the linear motion of the swingframe 134 to rotary motion characteristic of the rotary potentiometer for successful collection of data relative to the displacement of stylus 108 and stylus post 106.

It should be noted that, prior to performing a tracing operation with respect to the groove in frame 100, operator input 22 (FIG. 1) can be utilized not only to enter a pattern storage address or location number, but also a frame size. Entry of the frame size provides further flexibility in the operation of sub-system III in that, once sub-system I is provided with frame size data and collects frame shape data via the tracing technique described above, the system has sufficient data to enable sub-system III to generate either a lens identically sized and shaped for insertion in the originally traced frame, or a lens of identical shape but either larger or smaller size for insertion in a frame having a lens opening or openings of identical shape but larger or smaller size.

Thus far, the operation of sub-system I has been described in terms of the tracing operation performed with respect to a spectacle frame. A similar procedure is used to gather data by performing a tracing operation with respect to a pattern or lens. To gather data from a pattern or lens, operator input 22 (FIG. 1) is used to notify the processor 18 of the selection of that particular mode of operation. With reference to FIG. 6A, a pattern 12 is mounted on a pattern holder 120, the latter being connected for rotation, via pattern spindle 122, by motor 112.

In the case of a tracing operation performed with respect to a lens, referring to FIGS. 6A and 6B, a lens 124 is mounted on the holder 120 by means of a lens adapter 126, the lens 124 being connected to the lens adapter 126 by double-sided tape 128. Prior to affixation of the lens 124 to the adapter 126, the center and axis of the lens are located by disposing the lens 124 on the staging platform 104 of FIG. 2 (without the frame holder 102 or frame 100 in place), whereupon the lens is mechanically centered with respect to the A-box and B-box dimensions 106 inscribed on the platform 104. In this manner, the axis in the center of lens 124 (FIG. 6B) can be marked by simply using a marking pen, and these markings are then utilized to locate the lens 124 on the adapter 126.

Referring to FIG. 6A, when a pattern 12 is positioned on the holder 120 for tracing, a wheel follower 130 is positioned so as to contact the edge of pattern 12. Similarly, when a lens 124 is mounted on the holder 120, wheel follower 130 is positioned so as to contact the edge of the lens 124.

In operation, pattern spindle 122 is reversed-rotated to a few points before a zero-index point, and is then driven forward. As spindle 122 is driven forward, once the zero-index point is reached, data collection begins by reading potentiometer values indicating displacement of wheel follower 130, such displacement being detected by potentiometer 14 as a result of lateral displacement of the swingframe 134. More specifically, with respect to the operation of processor 18 (FIG. 1), as each new encoder position is sensed from the data provided by encoder 10, a new potentiometer value is read into (sampled by) the ADC 16, and the resulting digital data are stored in a data buffer (not shown). When the zero-index point is again reached, indicating that one full turn of the spindle 122 has been accomplished, a full set of data has been collected, and this full set of data is then transferred to the main storage area of processor 18. Of course, this information remains in the storage area until the operator either removes it or over-writes it with new data. Whereas processor 18 collects data relative to the tracing of a pattern 12 (FIG. 6A) or lens 124 in the manner just described, processor 18 utilizes the same technique of data collection to collect data relative to the tracing of a frame with one exception (discussed in the next paragraph).

Further referring to FIG. 6A, it is to be noted that, preferably, there is a difference between the diameter of the pulley wheel 132 associated with lens or pattern tracing and that of the tracer wheel 116 associated with frame tracing. It is preferable that the diameter of wheel 116 be twice as large as that of wheel 132 so as to provide for more gentle treatment of the frame. Processor 18 is programmed to take account of this difference so that, in the pattern or lens tracing modes, one rotation of pattern spindle 122, as reported by encoder 10, corresponds to one set of tracing data for a pattern or lens, while, in the frame tracing mode, two rotations of pattern spindle 122 (corresponding to one rotation of frame holder 102) corresponds to one set of tracing data for a frame.

When data is being collected from frame 100, the swingframe (sub-table) 134 is gravity-urged to hold the stylus 108 in the groove of the eyewire of frame 100. When data are gathered from a pattern 12 or lens 124, wheel follower 130 is urged toward the pattern 12 or lens 124 at the insistence of a spring (not shown) creating a force in the direction W (FIG. 6A). In addition, preferably, the swingframe 134 and support arms 136 and 138 form a parallelogram which keeps the swingframe 134 parallel to the plane of the frame 100, pattern 12 and lens 124. As the support arms 136 and 138 swing through an arc, wheel follower 130 does not lose contact with the pattern 12 or lens 124 during operation in the pattern/lens tracing mode, and stylus 108 does not lose contact with frame 100 during operation in the frame tracing mode. Of course, when a pattern 12 or lens 124 is being traced, frame holder 102 is not in position, and conversely when frame 100 is being traced, a pattern 12 or lens 124 is not in position.

The "swingframe" technique described above has been chosen because of the relatively friction-free motion characteristic of the resulting arrangement, as contrasted with the relatively greater friction experienced when a "sliding member" arrangement (involving sliding members, linear bearings and shafts, or other similar devices) is employed. In the present arrangement, as the swingframe 134 travels through an arc-like path, the stylus 108 is, as a result, held in a closer relationship to the normal contour of the lens frame 100. In addition, the support arms 136 and 138 and their associated roller bearings give good side-load rigidity, while allowing for light and constant tracking forces. In conjunction with the natural balancing action of the swingframe 134, biasing springs (mentioned above) are used to obtain optimum tracking pressures and balance. Finally, the arrangement of FIG. 6A has a particular advantage of simplicity of design in that, in accordance with the present invention, only a single potentiometer and only a single encoder 10 are necessary for sensing positions or displacement of either the stylus 108 (in the frame tracing mode) or the wheel follower 130 (in the lens or pattern tracing modes) relative to spindle position.

Figure 4:
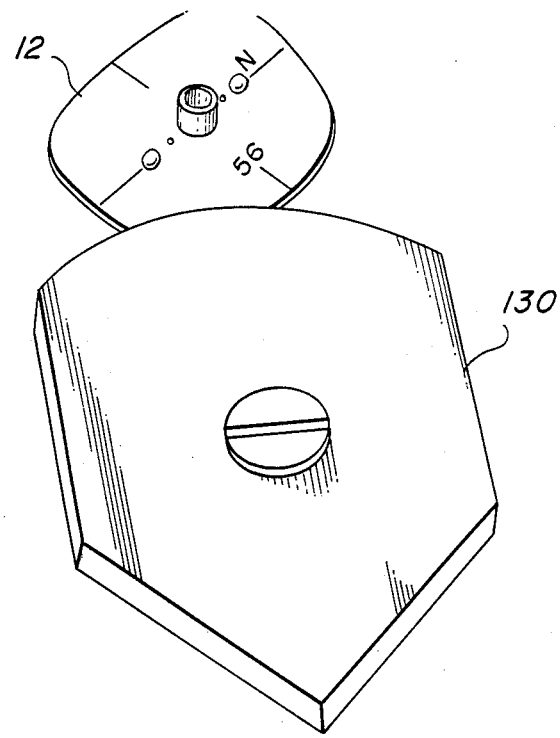
FIG. 4 is a perspective view of a lens pattern or template traced to collect wheel form data in sub-system I.
Figure 5:
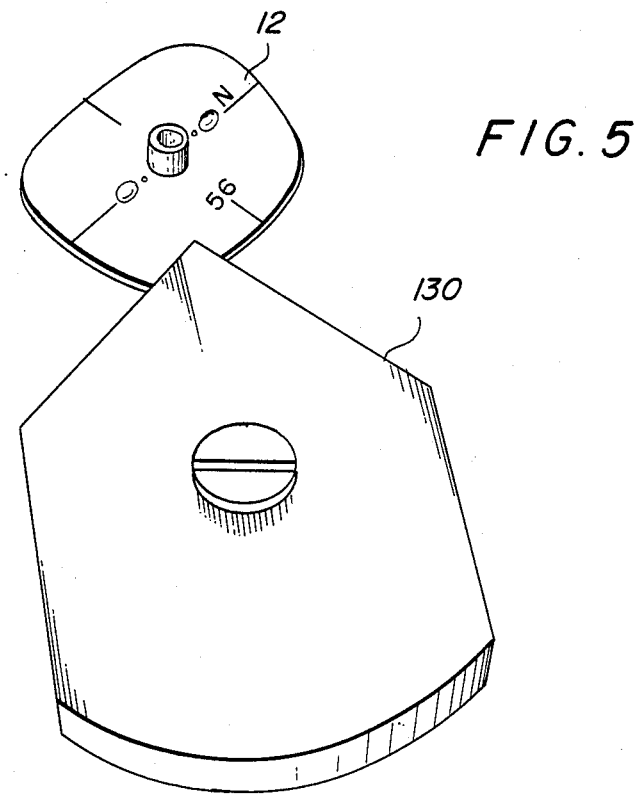
FIG. 5 is a perspective view of a lens pattern or template being traced to collect point-contact data in sub-system I.

FIG. 4 is a perspective view of wheel follower 130 being used, in one orientation, with a pattern 12 to generate wheel form data, while FIG. 5 is a perspective view of wheel follower 130 being used, in a reverse orientation, with the pattern 12 to generate point-contact data. Wheel form data is defined as data which can be used directly by an edger machine, such as that associated with sub-system III, to generate a lens. Point-contact data is defined as data obtained when the pattern 12 is traced by a point, the data serving an ancillary function, when connected to an external computer or mainframe computer, of making it possible to process the data so as to achieve a desired result, such as optimization of the thickness of a lens. Nevertheless it should be noted that point-contact data must be mathematically converted or translated to wheel form data in order to accomplish lens edging since the shape integrity of the edged lens seriously degenerates if the point-contact data are used to control the edging function.

Of course, as indicated above, instead of utilizing a pattern 12 to derive the wheel form data of FIG. 4 or the point-contact data of FIG. 5, lens 124 (FIGS. 6A and 6B) can be attached, via adapter 126, to the shaft 120 so as to permit gathering of shape data for edging. This has particular utility in the case where a patient breaks one lens and wants to replace only the broken lens. In such a situation, the good lens can be removed from the frame, and can be used as a pattern to collect shape data, which can then be processed and used by an edger to generate a replacement for the broken lens. Whereas, the shape data are generally collected in wheel form (since it is easier), if shape data are collected in point-contact form, a data inversion technique can be executed by the processor to develop the wheel form data necessary for edger generation of a new lens.

With respect to the distinction between wheel form data and point-contact data, if a circular lens is utilized as pattern 12 in FIGS. 4 and 5, the data collected would constitute a circle, regardless of whether it was wheel form data or point-contact data. However, all lens patterns are not circular in shape, and, as is well-known to those of skill in the art, point-contact data are especially useful when one desires to perform processing of the data, in accordance with well-known calculation techniques, so as to accomplish lens optimization using an external computer or mainframe computer. Thus, the present invention provides flexibility in that the system is capable of gathering data in either wheel form (per FIG. 4) or point-contact form (per FIG. 5), and the system is further flexible by virtue of the provision of sub-system II which can perform calculations with respect to the point-contact data for lens optimization. Moreover, as alluded to above and as discussed below, sub-system II has the further capability of translating point-contact data to wheel form, so that calculations can be performed on point-contact data, and data can be converted to wheel form for provision to sub-system III so as to be utilized for edging.

Returning to FIG. 1, sub-system II comprises a supervisor computer 40, which can be replaced/implemented by or interfaced to a mainframe computer, a personal computer or an Rx computer. In the case of replacement of supervisor computer 40 by a mainframe computer, a personal computer or an Rx computer, two conventional buffer storage devices of approximately 130 bytes each are used to interface the mainframe computer, personal computer or Rx computer to sub-systems I and III, respectively. Subsystem II is capable of performing both data storage and data translation, as well as various calculation techniques. In addition, sub-system II can receive data from or transmit data to sub-system I via communications interface 26 (a standard RS-232 interface) and sub-system III via communications interface 62 (also a standard RS-232 interface). The functions of sub-system II will be further discussed below.

Sub-system III is seen to comprise edger control processor 60, communications interface 62, operator input device 64, display unit 66, operating system 68, digital-to-analog converter (DAC) 70, and various processor-controlled system components. The processor-controlled system components comprise an analog amplifier arrangement made up of amplifiers 72 and 74, algebraic summing amplifier 76, offset potentiometer 78, feedback potentiometer 80, and servo motor 82.

In operation, wheel form data are received by processor 60 via communications interface 62. Various operator inputs can be provided to the processor 60 via operator input device 64, which can be any conventional operator input device, such as a keyboard unit. Results of processing or status information can be displayed to the operator on a conventional display unit 66. The operation of processor 60, which is any conventional computer or data processor, is controlled by an operating system 68.

When a lens is to be edged by an edger machine, processor 60 provides digital data to DAC 70 for conversion to analog form. The resulting analog data are passed, via amplifier 72 connected in a feedback arrangement, to one input of amplifier 74, the other input of which is connected to receive the output of algebraic summing amplifier 76. Algebraic summing amplifier 76 produces its output as a result of algebraic summing of the feedback output of feedback potentiometer 80 and an offset voltage provided by offset potentiometer 78. The offset voltage provided by potentiometer 78 adjusts "electrical zero" or size reference to correspond to the "mechanical zero" of the machine without disturbing the mechanical size control. The output of amplifier 74 is used to drive motor 82 which, as seen in FIG. 1, is monitored by feedback potentiometer 80 so as to develop a feedback output to amplifier 76 for the purpose of servo-controlling of motor 82. In short, the latter arrangement functions to provide servo control with a feedback loop which can be easily calibrated to the edgers for which the present design has been optimized.

Motor 82 is used to control various edger-controlled system components of the edger machine. The edger-controlled system components include a lens spindle 85 on which a lens 86 to be edged is mounted, the spindle 85 being driven by a spindle motor 94 in response to an input signal from signal buffer 92. Signal buffer 92 is a feedback-connected amplifier which, in response to an output signal from motor 82, provides an input drive signal to motor 94. A grinder motor 88 provides for rotation of an associated diamond wheel or edger implement 84 so that the lens 86 is edged by the diamond wheel or edger implement 84, the dimensions of the edged lens 86 being determined by the positioning of spindle 85 relative to diamond wheel or edger implement 84.

In the latter regard, the motor 82 is belt-coupled to a lead screw (not shown) which is nut-locked, the lead screw being rotated so as to move its associated nut up and down. An actuator (not shown) is attached to the nut and extends so as to contact the edger grinding head which houses lens spindle 85. In operation, the actuator responds to up and down movement of the nut (due to rotation of the lead screw by the servo motor) so as to raise and lower lens spindle 85 in accordance with each particular point of rotation of the lens 86, thus providing a means for contouring or shaping the lens 86 as it is edged by the diamond wheel or edger implement 84. The rotational position of lens 86 on spindle 85 is monitored by absolute encoder 90, and resulting positional data is provided by encoder 90 to processor 60. Thus, as each particular rotational position of lens 86 is detected by encoder 90, encoder 90 so advises processor 60, and processor 60 sends appropriate edging or contouring information via DAC 70 and the previously discussed analog amplifier arrangement to servo motor 82, the latter controlling the adjustment of positioning of lens 86 relative to diamond wheel or edging implement 84.

Figure 8:
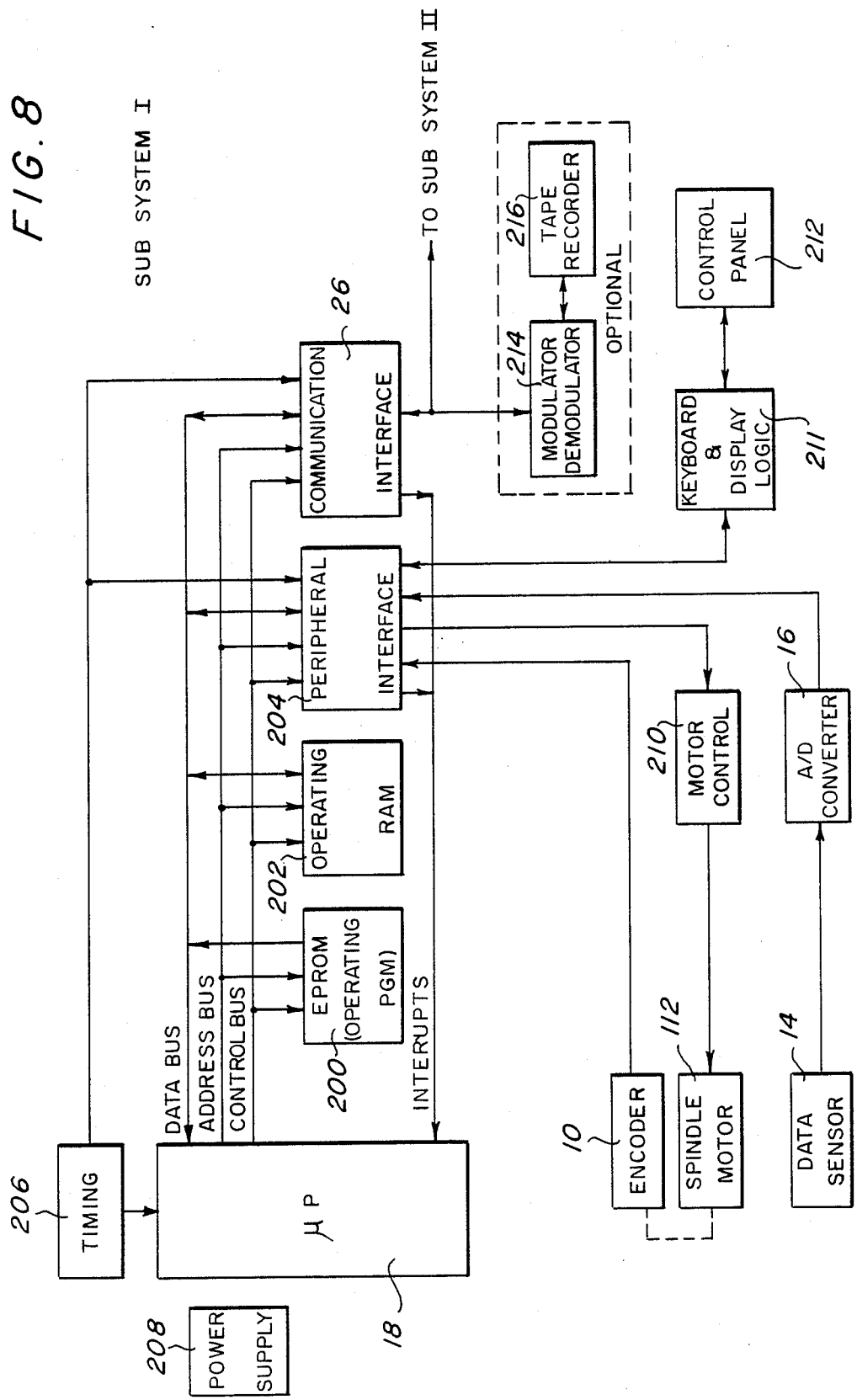
FIG. 8 is a diagram of a tracer control system (sub-system I) of the present invention.

FIG. 8 is a more detailed block diagram of sub-system I of FIG. 1. As seen therein, sub-system I comprises the following elements: encoder 10, data sensor 14, ADC 16, processor 18, and communications interface 26, each of which has been discussed as to its implementation and operation in connection with FIG. 1. As further shown in FIG. 8, sub-system I also includes the following elements: an erasable programmable read-only memory (EPROM) containing the operating program (corresponding to the operating system 20 of FIG. 1), operating random-access memory (RAM) 202 (previously referred to as the internal or operating memory of processor 18 of FIG. 1), a peripheral interface 204 serving as an input-output interface with respect to the processor 18 and its various associated elements, a motor control 210 (which can be any standard motor control unit for driving the spindle motor 112 of FIG. 6A), keyboard and display logic 211 and a control panel 212 (conventional elements used to implement the operator input device 22 and display unit 24 of FIG. 1), and a modulator/demodulator 214 for modulating data received from the communications interface 26 so as to be recordable on tape recorder 216, and for demodulating data received from the tape recorder 216 for provision, via the communications interface 26, to the processor 18.

Figure 9:
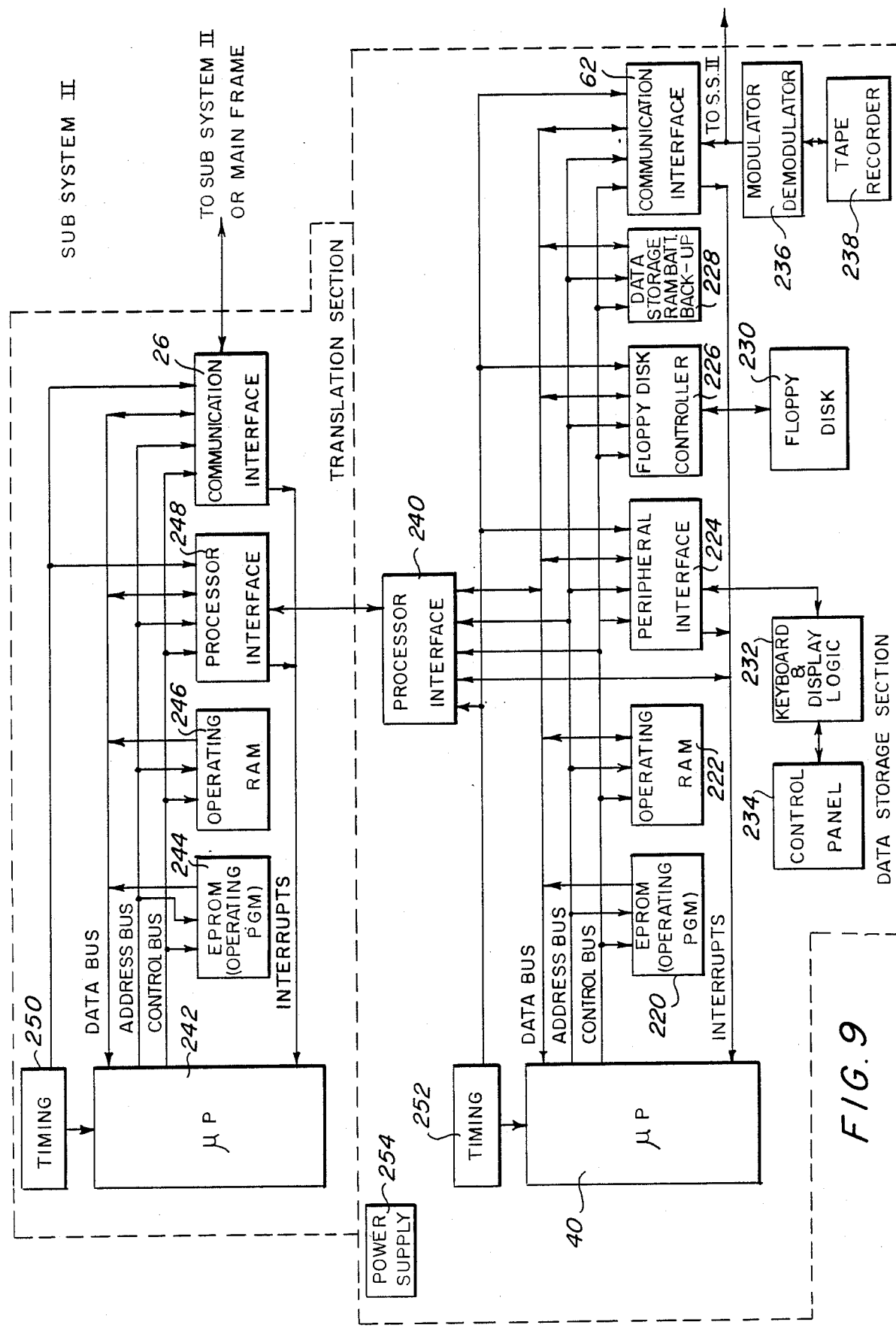
FIG. 9 is a diagram of a supervisor computer or data storage/translation system (sub-system II) of the present invention.

FIG. 9 is a block diagram of sub-system II of the present invention. As seen therein, sub-system II basically comprises a data storage section and a translation section.

The data storage section comprises the following elements: a microprocessor 40, an EPROM 220 containing the operating program, an operating RAM 222 providing storage for the microprocessor 40, a peripheral interface 224 serving as a conventional means for interfacing data between the microprocessor 40 and its associated elements, a floppy disk controller 226 and associated floppy disk unit 230, a data storage or RAM storage device 228 having battery back-up, a keyboard and display logic 232, a control panel 234, a modulator/demodulator 236 for modulating data provided by the communications interface 62 for recording on tape recorder 238, and for demodulating data from tape recorder 238 for provision, via communications interface 62, to microprocessor 40, and a processor interface 240 providing a conventional interface between the data storage section and the translation section.

The translation section of sub-system II comprises a further microprocessor 242, EPROM 244 containing the operating program for microprocessor 242, an operating RAM 246, a processor interface 248 for interfacing the translation section to the data storage section, and communications interface 26 providing a data communications interface between the translation section of sub-system II and either sub-system I or a further mainframe computer.

It should be noted that communications interface 62 of the data storage section of sub-system II serves as an RS-232 communications interface, by means of which data can be provided by microprocessor 40 of sub-system II to sub-system III in order to accomplish edging operations. It should also be noted that the data storage section has a conventional timing element 252, normally associated with the particular microprocessor implemented as microprocessor 40, and a conventional power supply 254, while the translation section is provided with a conventional timing unit 250, which is any conventional timing unit normally associated with the microprocessor implemented as microprocessor 242.

As mentioned earlier, sub-system II performs data storage functions with respect to the data collected by sub-system I. It can also perform data storage functions with respect to any data (typically, point-contact data) received from any mainframe computer, personal computer or Rx processor to which it is interfaced. When sub-system II receives point-contact data, the data are converted to wheel form before they are transferred to storage. This is based on the realization that the primary purpose for point-contact data is to facilitate lens perameter calculations, and all of these calculations will have been performed by other components of the system or other entities prior to arrival of the data at sub-system II. Furthermore, since point-contact data are useless for edger operations, it is logical that data conversion or translation be accomplished prior to storing the data.

However, when a mainframe computer, a personal computer or an Rx processor is to be used for lens optimization calculations, it may be desirable to store the data in point-contact form so that the data may be readily available for repeated use in performing such calculations. Therefore, with such operating conditions in mind, it would be logical to arrange the system operation so that data are stored in point-contact form in sub-system II, and conversion or translation to wheel form is carried out just prior to transfer of data by sub-system II to sub-system III for edger operations.

Referring to FIG. 9, data are received via communications interface 26, translated (if necessary) by microprocessor 242, and then provided via interfaces 248 and 240 to the data storage section, in particular to data storage RAM 228, the latter being provided with battery back-up so as to prevent data loss in the event of power failure. Of course, the data can alternatively be provided via controller 226 to floppy disk 230 if floppy disk storage is preferred. If storage on magnetic tape is desired, the data can be provided via communications interface 62 and modulator/demodulator 236 to the tape recorder 238.

The translation section of sub-system II performs data translation using known mathematical iteration techniques to convert data from one form (e.g., point-contact form) to another form (e.g., wheel form). Thus, point-contact data received from sub-system I via communications interface 26 are, as previously discussed, translated by microprocessor 242 into wheel form either prior to data storage (in one embodiment) or just prior to transfer to sub-system III for edger operations (in another embodiment). Such data are provided to the data storage section via interfaces 248 and 240, and are further provided, via communications interface 62, to sub-system III. Since, as previously mentioned, data are transmitted through communications interfaces 26 and 62 in ASCII form, and since sub-systems I, II, and III operate on data in hexadecimal form, sub-system I, II and III have the capability of translating data from ASCII to hexadecimal, and vice-versa. In sub-system II, this function is carried out by the translation section.

Figure 10:
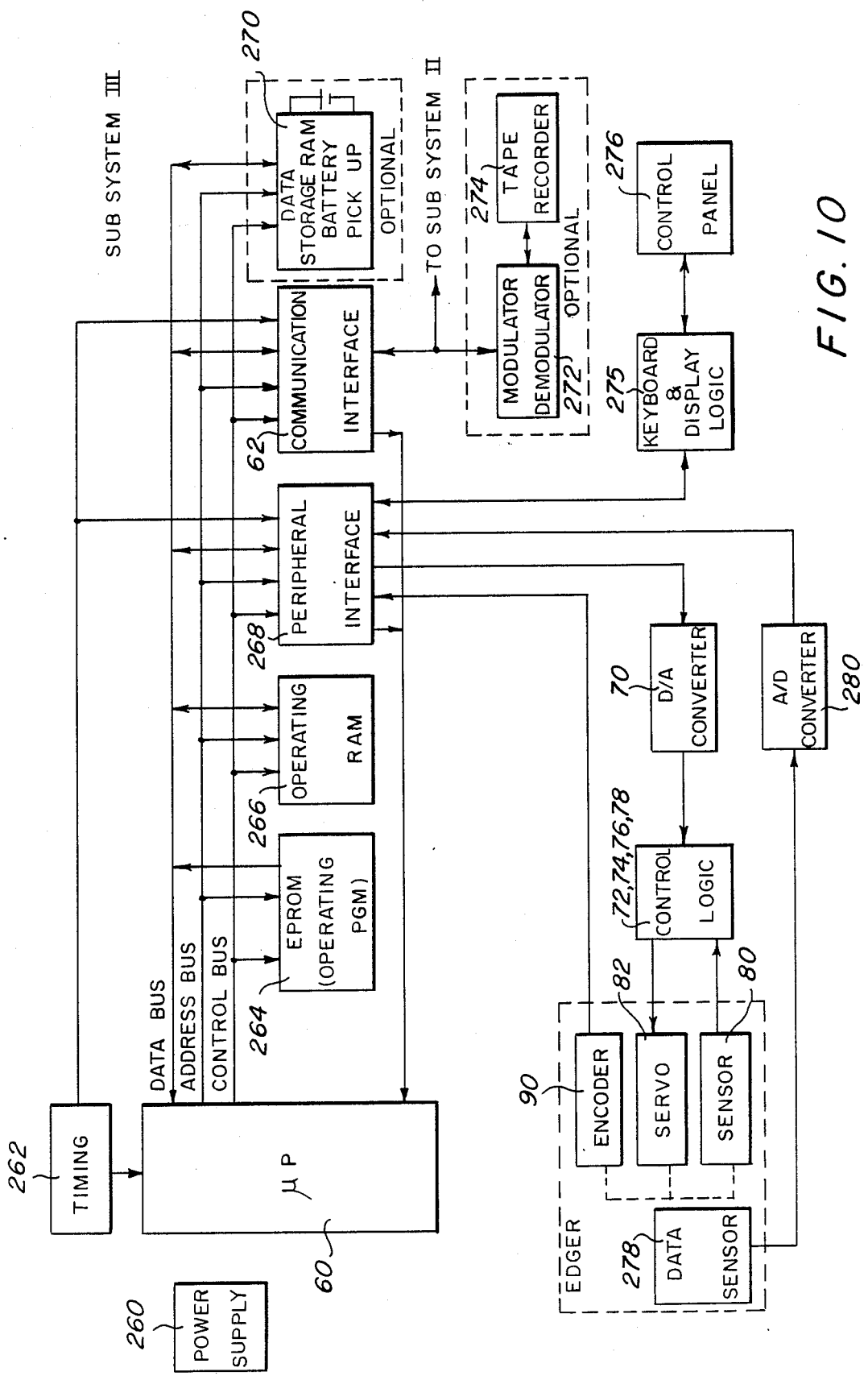
FIG. 10 is a diagram of an edger control system (sub-system III) of the present invention.

FIG. 10 is a block diagram of sub-system III of the present invention. As seen therein, sub-system III comprises previously discussed microprocessor 60, communications interface 62, DAC 70, analog control circuitry 72, 74, 76 and 78, motor sensor (feedback potentiometer) 80, servo motor 82 and encoder 90, all shown in FIG. 1. In addition, the sub-system III comprises the following elements: power supply 260, conventional timing unit 262 associated with the microprocessor implemented as microprocessor 60, EPROM 264, operating RAM 266, a conventional peripheral interface 268, a data storage RAM (with battery back-up) 270, modulator/demodulator 272 for modulating or demodulating data transferred between communications interface 62 and tape recorder 274, keyboard and display logic 275, control panel 276 (implementing the operator input 64 and display unit 66 of FIG. 1), a data sensor 278 associated with the edger machine, and an ADC 280 for converting data sensed by sensor 278 to digital form for provision, via interface 268, to microprocessor 60.

Sub-system III may operate either as a stand-alone unit or as part of the larger-scale system described above. As a stand-alone unit, data storage RAM 270 is provided, the RAM 270 having an inherent battery back-up capability to prevent the loss of data if a power failure occurs. In addition, sub-system III is provided with the capability of storing data on tape recorder 274 (via modulator/demodulator 272) so as to provide archival storage, particularly beneficial in the event of a catastrophic loss of memory.

As previously mentioned, all data are stored in sub-system III in wheel form, since wheel form data (as opposed to point-contact data) are exclusively used for edging operations. When sub-system III operates as a part of the overall system of the present invention, data are received from or transmitted to sub-system II via conventional RS-232 communications interface 62.

When sub-system III operates as a stand-alone unit, some of the previously described data collection capabilities (discussed above with respect to sub-system I) can be incorporated into the overall capabilities of sub-system III, so that sub-system III can derive edging data by placing a pattern on the edger machine. In this regard, the lens 86 shown in FIG. 1 can be replaced by a pattern mounted on the spindle shaft 85 of the edger machine. With sub-system III placed in the "recording" mode (via operator input 64 of FIG. 1), and with the assignment of a pattern location number or storage address via operator input 64 of FIG. 1, operation and cycling of the edger machine in a manner similar to the operation of sub-system I, previously described, can be carried out. During such an operation, the data sensor 278 of FIG. 10 collects size data and provides that data to ADC 280 for conversion to digital form, whereupon the digital data are provided via interface 268 to processor 60 for eventual storage in sub-system III.

More specifically, the servo motor 82 (FIG. 1) is driven in such a manner that the previously discussed actuator (attached to the nut associated with the lead screw to which the servo motor is belt-coupled) is driven to a lowermost position. A potentiometer (not shown) is then used to derive voltage signals corresponding to the pattern dimensions as the pattern is rotated on spindle 85. In addition, absolute encoder 90 is used to transmit, to processor 60, signals representing the rotational position of shaft 85, and thus of the pattern. Processor 60 (FIG. 10) receives the voltage signals representing the pattern dimensions in digital form, as converted by ADC 280, and the digital signals representing rotational position from encoder 90.

Once such pattern data are stored, the data sensor 278 is disconnected, and the mode of the sub-system III is changed to "normal operation". Normal operation of sub-system III consists of utilizing the data collected and stored in sub-system III during the "recording mode" for carrying out edging operations, as previously described with respect to FIG. 1.

It is to be noted that sub-system III, being provided with its own integral processor 60, can handle such tasks as expanding compressed data, electronic size changing with respect to a lens, correcting for diamond wheel wear, inverting data from right eye data to left eye data (and vice-versa), and conducting a number of self-testing routines with respect to hardware and/or software operations. The control panel 276, implemented by any conventional control panel, can provide display of pattern storage location, size of pattern recorded, left eye, right eye, a "wait" indicator and a "read" indicator, as required or deemed necessary.

Figure 11A:
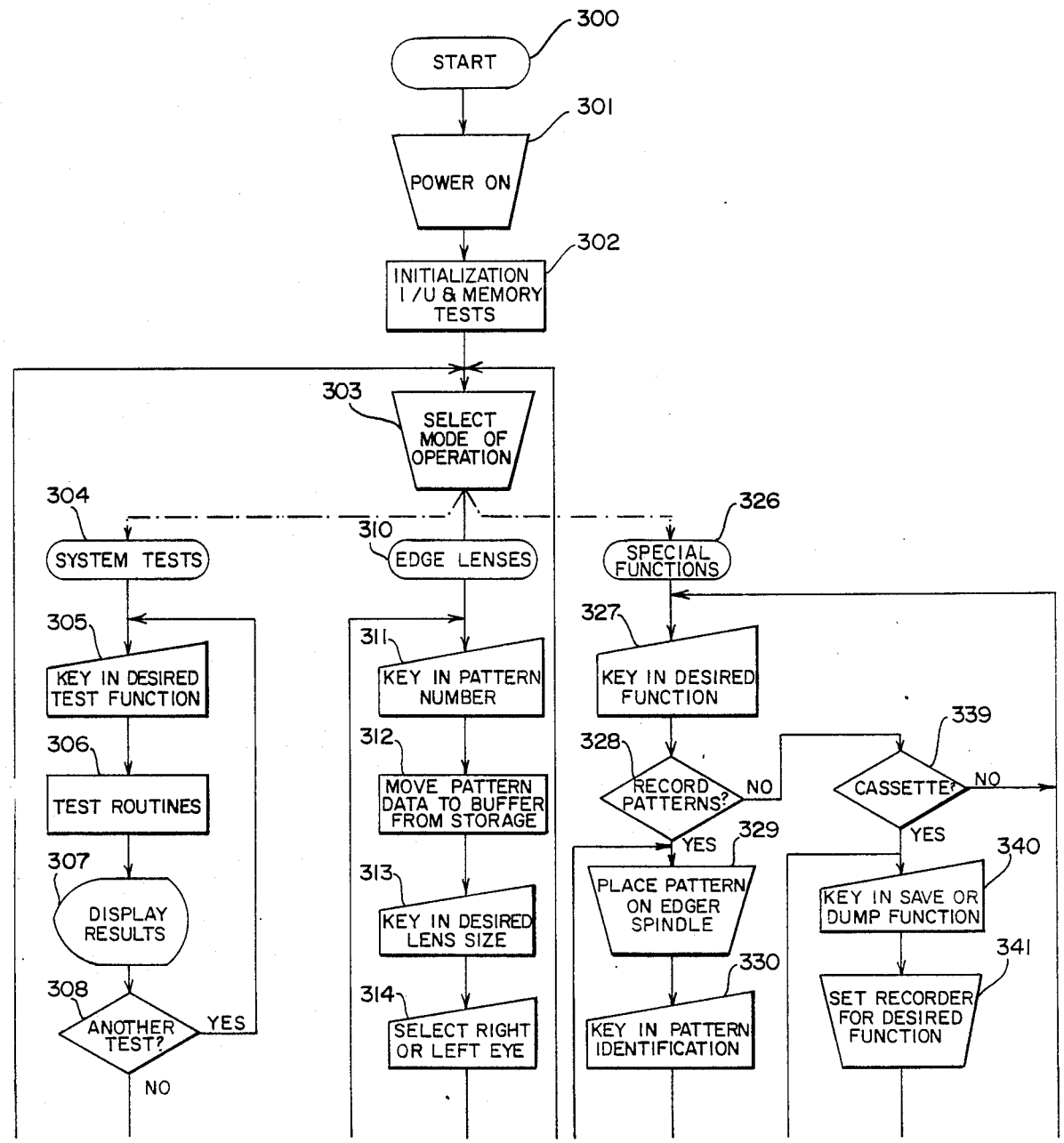
FIG. 11A and B is a flowchart of the operations performed by the edger control system (sub-system III) of the present invention, but also shows the operations performed by the tracer control system (sub-system I) and data storage/translation system (sub-system II) of the present invention.
Figure 11B:
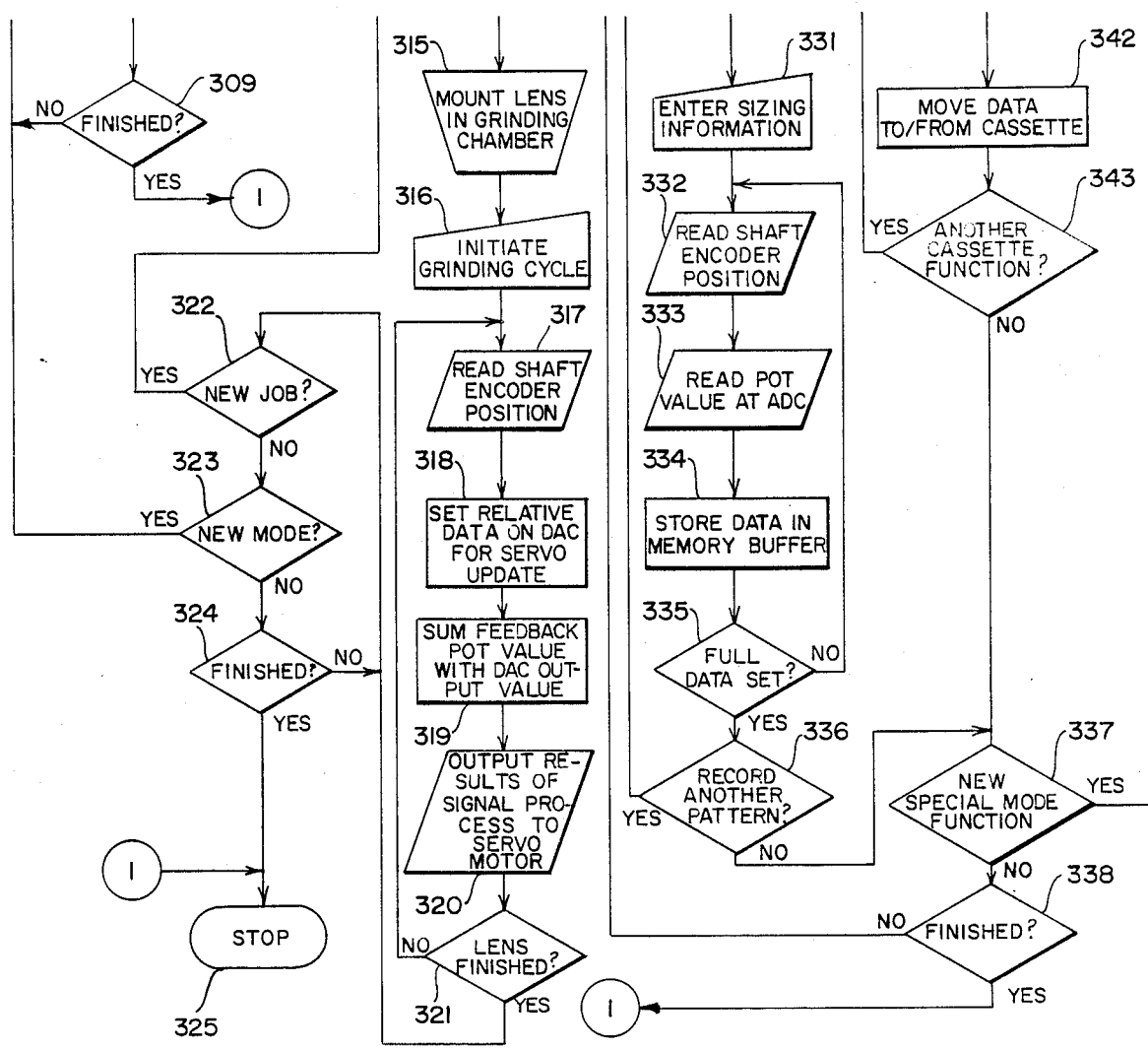

FIG. 11 is a flowchart of operations performed in the computerized edging system of the present invention. As seen in FIG. 11, the flowchart has three basic branches. The first branch is a test branch (blocks 304-309) for conducting tests and displaying test results with respect to various operations, as deemed necessary or required by the system designer or operator. Such test operations are performed by the processors 18, 40 and 60 of sub-systems I, II and III, respectively. The test operations are within the skill of one of ordinary skill in the art, and need not be discussed in more detail here.

A second mode of operation or branch of the flowchart relates to the performance of an edging operation by sub-system III under the control of processor 60 (FIG. 10), as instructed by the operating program in EPROM 264. As indicated in this branch of the flowchart, sub-system III responds to the entry of a pattern number (block 311 of FIG. 11) at the keyboard or operator input device 64 (FIG. 1) by moving data (block 312 of FIG. 11) from either RAM 270 (FIG. 10), tape recorder 274, or other storage device to a buffer storage area (typically located in operating RAM 266), at which point the desired size of the lens is entered by the operator (block 313 of FIG. 11), the right or left eye is selected for lens fabrication (block 314 of FIG. 11), the lens is mounted in the edger machine (block 315 of FIG. 11), and the edging cycle is started (block 316 of FIG. 11), with edging taking place in accordance with the shape data stored in RAM 266, and under control of microprocessor 60.

It will be recalled from earlier discussion that, relative to each shaft encoder position, there will be a corresponding data value stored in memory, which data value represents the lens/frame dimension at that shaft encoder position. Accordingly, during the edging process, as set forth in FIG. 11, the shaft encoder position is read (block 317), the appropriate data word is fetched from memory and provided to the DAC 70 of FIGS. 1 and 10 for servo update (block 318 of FIG. 11), and then (as previously discussed) the output of DAC 70 (FIG. 1) is provided, via feedback-connected amplifier 72, to one input of amplifier 74, the other input of which is connected to receive the output of algebraic summing amplifier 76, amplifier 76 deriving its output as a result of algebraic summation of the feedback output of feedback potentiometer 80 and an offset voltage provided by offset potentiometer 78. The output of amplifier 74 is used to drive the servo mechanism (servo motor 82) which, in turn, controls the spindle shaft 85 for lens shaping and size processing, as previously discussed above with respect to FIG. 1.

Once the edging cycle is completed (block 321 of FIG. 11), the processor 60 (FIG. 10) waits for the next cycle, and a decision is made as to whether or not another job is to be performed (block 322 of FIG. 11). If not, decisions are made as to whether or not another mode is to be selected (block 323 of FIG. 11) and as to whether or not operation is to be terminated (block 324 of FIG. 11). If no new modes are to be selected and system operation is completed, an exit routine is carried out (block 325 of FIG. 11).

A third branch of the flowchart of FIG. 11 concerns the data collection and transfer functions (blocks 326–343 of FIG. 11) which can be carried out by sub-system I (as controlled by processor 18 of FIG. 8, instructed by the operating program in EPROM 200), or by sub-system III operating in a stand-alone configuration (as controlled by processor 60 of FIG. 10, instructed by the operating program in EPROM 264). A desired function is keyed in (block 327 of FIG. 11) by the operator, using operator inputs 22 or 64 of FIG. 1. If a pattern is to be recorded (block 328 of FIG. 11), the pattern is placed on the appropriate spindle (block 329 of FIG. 11), that is, either pattern spindle 122 of FIG. 6A or the spindle 85 of FIG. 1. Then, pattern identification information is keyed in (block 330 of FIG. 11), and sizing information is entered (block 331 of FIG. 11). The pattern recording procedure previously discussed above is then implemented; the shaft encoder position is read (block 332 of FIG. 11), the potentiometer value, converted to digital form by either ADC 16 of FIG. 8 or ADC 280 of FIG. 10, is read by the corresponding processor (block 333 of FIG. 11), and the resulting data are stored in a memory buffer (in a corresponding RAM 202 of FIG. 8 or 266 of FIG. 10) by the corresponding processor 18 of FIG. 8 or 60 of FIG. 10 (block 334 of FIG. 11).

A decision is then made as to whether or not a complete data set has been collected (block 335 of FIG. 11). If a complete data set has not been collected, the steps previously described (blocks 332–334 of FIG. 11) are repeated until a complete data set has been collected. Once a complete data set has been collected, a decision is made as to whether or not to record another pattern (block 336). Once the last pattern has been recorded, a decision is made as to whether or not a new special mode function is to be selected (block 337 of FIG. 11). If a new special mode function is to be selected, a return to block 327 of FIG. 11 is executed; if not, a decision as to whether or not operation of the system has been completed is made (block 338 of FIG. 11). If not, a return to the mode selection step (block 303 of FIG. 11) is executed; if operation is completed, an exit routine is carried out (block 325 of FIG. 11).

It should be noted that blocks 328–336 of FIG. 11 generally describe the operations performed by sub-system I in tracing not only a pattern, but also a lens or frame. The words "pattern" or "patterns" in blocks 328–330 and 336 need only be changed to "lens" or "frame", and the words "edger spindle" in block 329 need only be changed to "lens/pattern spindle" or "frame spindle", as appropriate, in order to convert the relevant portion of the flowchart of FIG. 11.

Another special function which can be carried out by the sub-system I of FIG. 8, sub-system II of FIG. 9 or sub-system III of FIG. 10 involves the storage of data on or retrieval of data from magnetic tape cassettes, those operations being carried out by means of tape recorders 216 of FIG. 8, 238 of FIG. 9, or 274 of FIG. 10. The processor operations involved are described in blocks 339–343 of FIG. 11, and involve an initial decision as to whether or not cassette storage or retrieval operations are to be carried out (block 339 of FIG. 11). The particular function ("save" or "dump") is entered by the operator (block 340 of FIG. 11), and the recorder is then set for the desired function (block 341 of FIG. 11). Data are then transferred to or from the cassette (block 342 of FIG. 11), and a decision is made as to whether or not another cassette function is to be carried out (block 343 of FIG. 11). If so, a return to the "keying in" step (block 340 of FIG. 11) is executed; if not, a branch to the decision blocks (blocks 337 and 338 of FIG. 11) is executed.

With respect to the operations of the sub-system II of FIG. 9, as previously mentioned, the translation operations (for example, from point-contact data to wheel form data) are carried out by the processor 242 in the translation section of sub-system II. Since these translation functions involve the mere implementation, in a computer program, of well-known, conventional mathematical techniques, it is not necessary to disclose those techniques in the form of a flowchart or a computer program. Similarly, the data storage section of sub-system II of FIG. 9 performs, under program control, various processor operations necessary for the transfer of data to and from storage areas. Such data transfer operations are well-known in the art, and it is not necessary to further disclose those operations in the form of a flowchart or computer program.

While preferred forms and arrangements have been shown in illustrating the invention, it is to be understood that various changes in detail and arrangement may be made without departing from the spirit and scope of this disclosure.

I claim:

1. A computerized multi-processor system for the tracing and automated edging of an ophthalmic lens, comprising:

tracing means for performing a tracing operation with respect to any one of a frame, a pattern and a lens to derive data relating to the dimensions thereof;

storing means for storing said data relating to the dimensions of said any one of said frame, said pattern and said lens;

accessing means for accessing said storing means so as to read out said data relating to the dimensions of said any one of said frame, said pattern and said lens;

processing means for processing said data read from said storing means by said accessing means so as to derive control signals for the edging of said ophthalmic lens; and edging means responsive to said control signals from said processing means for edging said ophthalmic lens so as to provide said ophthalmic lens with dimensions corresponding to the dimensions of said any one of said frame, said pattern and said lens;

wherein said tracing means comprises a tracing sub-system, said tracing sub-system including a tracing processor for generating tracing control signals to control said tracing operation and for receiving data corresponding to the dimensions of said any one of said frame, said pattern and said lens as the dimensions of said any one of said frame, said pattern and said lens are traced during the tracing operation; and wherein said storing means comprises a storing sub-system, said storing sub-system including a storing processor separate from said tracing processor for receiving and storing the data corresponding to the dimensions of said any one of said frame, said pattern and said lens;

said system further comprising interface means between said tracing sub-system and said storing sub-system for conveying data in at least one direction between said tracing sub-system and said storing sub-system;

whereby said tracing sub-system and said storing sub-system are able to operate independently or to operate, via said interface means, in a related manner.

2. The system of claim 1, further comprising digitizing means for digitizing said data derived by said tracing means to produce digital data;

wherein said data stored by said storing means, accessed by said accessing means and processed by said processing means comprises said digital data.

3. A computerized tracing and edging system for the automated edging of an ophthalmic lens, comprising:

tracing means for performing a tracing operation with respect to a frame to derive data relating to the dimensions thereof, storing means for storing said data relating to the dimensions of said frame, accessing means for accessing said storing means so as to read out said data relating to the dimensions of said frame, processing means for processing said data read from said storing means by said accessing means so as derive control signals for the edging of said ophthalmic lens, and edging means responsive to said control signals from said processing means for edging said ophthalmic lens so as to provide said ophthalmic lens with dimensions corresponding to the dimensions of said frame;

wherein said tracing means comprises:

a frame holder for holding said frame in a tracing position, said frame having a generally loop-like structure defining a frame plane, a stylus disposed in said frame plane and inside of said loop-like structure so that said loop-like structure surrounds said stylus, said stylus extending toward said frame so that a distal end of said stylus contacts said frame, and moving means for creating relative rotational movement of said frame with respect to said stylus so that said stylus contacts said frame at successive points along the loop-like structure of said frame, whereby said stylus effectively traces the loop-like structure of said frame; and wherein said stylus has a pivot end remote from said distal end, said pivot end being located at a base position prior to relative motion of said frame with respect to said stylus, and wherein the position of said pivot end of said stylus varies from said base position during relative motion of said frame with respect to said stylus, and wherein the position of said pivot end of said stylus varies from said base position in accordance with the dimensions of said loop-like structure of said frame as said loop-like structure of said frame is traced by said stylus;

said tracing means comprising potentiometer means operatively associated with said stylus and responsive to the position of said pivot end of said stylus for generating an electrical signal which varies in accordance with variation of the position of said pivot end of said stylus from said base position, the electrical signal being provided to said tracing means;

said tracing means comprising a tracing sub-system including a tracing processor responsive to said electrical signal for generating tracing control signals to control said tracing operation.

4. A computerized edging system for the automated edging of an ophthalmic lens, comprising:

tracing means for performing a tracing operation with respect to a frame to derive data relating to the dimensions thereof, storing means for storing said data relating to the dimensions of said frame, accessing means for accessing said storing means so as to read out said data relating to the dimensions of said frame, processing means for processing said data read from said storing means by said accessing means so as derive control signals for the edging of said ophthalmic lens, and edging means responsive to said control signals from said processing means for edging said ophthalmic lens so as to provide said ophthalmic lens with dimensions corresponding to the dimensions of said frame;

wherein said tracing means comprises:

a frame holder for holding said frame in a tracing position, said frame having a generally loop-like structure defining a frame plane, a stylus disposed in said frame plane and inside of said loop-like structure so that said loop-like structure surrounds said stylus, said stylus extending toward said frame so that a distal end of said stylus contacts said frame, and moving means for creating relative rotational movement of said frame with respect to said stylus so that said stylus contacts said frame at successive points along the loop-like structure of said frame, whereby said stylus effectively traces the loop-like structure of said frame; and wherein said stylus has a pivot end remote from said distal end, and said moving means comprises a motor which imparts motion to said frame holder so as to rotate the loop-like structure of said frame around said stylus, whereby to create a relative tracing movement of said stylus with respect to said loop-like structure of said frame; and wherein the pivot end of said stylus is connected to one end of a stylus post, said stylus post extending away from the pivot end of said stylus in a direction generally perpendicular to the frame plane, said stylus post having another end remote from said one end, said another end of said stylus post being connected to a swingframe oriented in a plane generally parallel to said frame plane, and wherein the position of said pivot end of said stylus varies from a base position in accordance with the dimensions of said loop-like structure of said frame as said loop-like structure of said frame is traced by said stylus;

said tracing means including a potentiometer mounted on a framework of said system and a slider mounted on said swingframe of said system, and wherein movement of said pivot end of said stylus from said base position translates into movement of said slider relative to said potentiometer, said potentiometer generating an electrical signal which varies in accordance with variation of the position of said pivot end of said stylus from said base position as said stylus traces the loop-like structure of said frame, the electrical signal being provided to at least one of said tracing means, said storing means and said edging means.

5. A computerized tracing and edging system for the automated edging of an ophthalmic lens, comprising:

tracing means for performing a tracing operation with respect to any one of a pattern and a lens to derive data relating to the dimensions thereof, storing means for storing said data relating to the dimensions of said any one of said pattern and said lens, accessing means for accessing said storing means so as to read out said data relating to the dimensions of said any one of said pattern and said lens, processing means for processing said data read from said storing means by said accessing means so as derive control signals for the edging of said ophthalmic lens, and edging means responsive to said control signals from said processing means for edging said ophthalmic lens so as to provide said ophthalmic lens with dimensions corresponding to the dimensions of said any one of said pattern and said lens;

wherein said tracing means comprises:

a holder for holding said any one of said pattern and said lens in a tracing position, said any one of said pattern and said lens having a generally flat structure defining a given plane, a wheel follower disposed in said given plane and movable into a position adjacent said any one of said pattern and said lens so that a peripheral portion of said wheel follower contacts said any one of said pattern and said lens, and moving means for producing relative motion between said holder and said wheel follower so that the peripheral portion of said wheel follower contacts said any one of said pattern and said lens at successive points along a periphery of said any one of said pattern and said lens, whereby the periphery of said any one of said pattern and said lens is effectively traced by said wheel follower; and wherein said any one of said pattern and said lens is rotated by said moving means, said wheel follower being located at a base position at commencement of rotation of said any one of said pattern and said lens, and wherein the position of said wheel follower varies from said base position during rotation of said any one of said pattern and said lens, and wherein the position of said wheel follower varies from said base position in accordance with the dimensions of said any one of said pattern and said lens as the periphery of said any one of said pattern and said lens is traced by said wheel follower;

said tracing means comprising potentiometer means operatively associated with said wheel follower and responsive to the position of said wheel follower for generating an electric signal which varies in accordance with variation of the position of said wheel follower from said base position, the electrical signal being provided to said tracing means;

said tracing means comprising a tracing sub-system including a tracing processor responsive to said electrical signal for generating tracing control signals to control said tracing operation.

6. A computerized edging system for the edging of an ophthalmic lens, comprising:

tracing means for performing a tracing operation with respect to any one of a pattern and a lens to derive data relating to the dimensions thereof, storing means for storing said data relating to the dimensions of said any one of said pattern and said lens, accessing means for accessing said storing means so as to read out said data relating to the dimensions of said any one of said pattern and said lens, processing means for processing said data read from said storing means by said accessing means so as derive control signals for the edging of said ophthalmic lens, and edging means responsive to said control signals from said processing means for edging said ophthalmic lens so as to provide said ophthalmic lens with dimensions corresponding to the dimensions of said any one of said pattern and said lens;

wherein said tracing means comprises:

a holder for holding said any one of said pattern and said lens in a tracing position, said any one of said pattern and said lens having a generally flat structure defining a given plane, a wheel follower disposed in said given plane and movable into a position adjacent said any one of said pattern and said lens so that a peripheral portion of said wheel follower contacts said any one of said pattern and said lens, and moving means for producing relative motion between said holder and said wheel follower so that the peripheral portion of said wheel follower contacts said any one of said pattern and said lens at successive points along a periphery of said any one of said pattern and said lens, whereby the periphery of said any one of said pattern and said lens is effectively traced by said wheel follower; and wherein said tracing means includes a wheel follower axle connected to said wheel follower at a center point of said wheel follower, said wheel follower axle extending from said wheel follower in a direction generally perpendicular to said given plane, said wheel follower axle having a remote end remote from said wheel follower, said remote end of said wheel follower axle being connected to a swingframe oriented in a plane generally parallel to said given plane, and wherein the position of said wheel follower varies from a base position in accordance with the dimensions of said any one of said pattern and said lens as said any one of said pattern and said lens is traced by said wheel follower;

said tracing means including a potentiometer mounted on a framework of said system and a slider mounted on said swingframe of said system, and wherein movement of said wheel follower from said base position translates into movement of said slider relative to said potentiometer, said potentiometer generating an electric signal which varies in accordance with variation of the position of said wheel follower from said base position as said wheel follower traces said any one of said pattern and said lens, the electrical signal being provided to at least one of said tracing means, said storing means and said edging means.

7. The system of any one of claims 5 or 6, wherein said moving means comprises a motor which rotates said any one of said pattern and said lens as disposed on said holder, whereby to create a relative tracing movement of said wheel follower with respect to said any one of said pattern and said lens.

8. A computerized edging system for the edging of an ophthalmic lens, comprising:
 tracing means for performing a tracing operation with respect to any one of a frame, a pattern and a lens to derive data relating to the dimensions thereof,
 storing means for storing said data relating to the dimensions of said any one of said frame, said pattern and said lens,
 accessing means for accessing said storing means so as to read out said data relating to the dimensions of said any one of said frame, said pattern and said lens,
 processing means for processing said data read from said storing means by said accessing means so as derive control signals for the edging of said ophthalmic lens, and
 edging means responsive to said control signals from said processing means for edging said ophthalmic lens so as to provide said ophthalmic lens with dimensions corresponding to the dimensions of said any one of said frame, said pattern and said lens;
 wherein said tracing means comprises a tracing sub-system, said tracing sub-system includes a tracing processor, and said storing means comprises a storing sub-system, said storing sub-system including a storing processor separate from said tracing processor for receiving said data generated by said tracing means, and a memory for storing said data received by said storing processor; and
 wherein said storing processor processes said data received from said tracing sub-system prior to storage in said memory of said storing sub-system; and
 wherein said storing processor includes translation means for translating said data from point-contact data to wheel form data or vice-versa;
 said system further comprising interface means between said tracing sub-system and said storing sub-system for conveying data in at least one direction between said tracing sub-system and said storing sub-system;
 whereby said tracing sub-system and said storing sub-system are able to operate independently or to operate, via said interface means, in a related manner.

9. A computerized edging system for the automated edging of an ophthalmic lens, comprising:
 tracing means for performing a tracing operation with respect to any one of a frame, a pattern and a lens to derive data relating to the dimensions thereof,
 storing means for storing said data relating to the dimensions of said any one of said frame, said pattern and said lens,
 accessing means for accessing said storing means so as to read out said data relating to the dimensions of said any one of said frame, said pattern and said lens,
 processing means for processing said data read from said storing means by said accessing means so as derive control signals for the edging of said ophthalmic lens, and
 edging means responsive to said control signals from said processing means for edging said ophthalmic lens so as to provide said ophthalmic lens with dimensions corresponding to the dimensions of said any one of said frame, said pattern and said lens;
 wherein said storing means comprises a storing sub-system, said storing sub-system including a storing processor for receiving said data derived by said tracing means, and a memory for storing said data received by said storing processor; and
 wherein said processing means comprises an edging processor separate from said storing processor and connected to said storing processor via a communications interface for receiving data from said storing sub-system, said edging means comprising an edger for edging said ophthalmic lens so as to provide said ophthalmic lens with dimensions corresponding to the dimensions of said any one of said frame, said pattern and said lens; and
 wherein said data received by said edging processor comprises digital data, said processing means further comprising a digital-to-analog converter, said edging processor providing said digital data to said digital-to-analog converter, said digital-to-analog converter converting said digital data to analog signals, said processing means further comprising a control arrangement, said digital-to-analog converter providing said analog signals to said control arrangement, said control arrangement being responsive to said analog signals for producing control signals, said processing means further comprising a servo-motor, said control arrangement providing said control signals to said servo-motor, said servo-motor being responsive to said control signals for producing said control signals for the edging of said ophthalmic lens.

10. A computerized edging system for the edging of an ophthalmic lens, comprising:
 tracing means for performing a tracing operation with respect to any one of a frame, a pattern and a lens to derive data relating to the dimensions thereof,
 storing means for storing said data relating to the dimensions of said any one of said frame, said pattern and said lens,
 accessing means for accessing said storing means so as to read out said data relating to the dimensions of said any one of said frame, said pattern and said lens,
 processing means for processing said data read from said storing means by said accessing means so as derive control signals for the edging of said ophthalmic lens, and
 edging means responsive to said control signals from said processing means for edging said ophthalmic lens so as to provide said ophthalmic lens with dimensions corresponding to the dimensions of said any one of said frame, said pattern and said lens;
wherein said tracing means comprises a tracing sub-system, said tracing sub-system comprising:
a tracing processor for generating tracing control signals to control said tracing operation,
a motor responsive to said tracing control signals for moving said any one of said frame, said pattern and said lens,
a tracing mechanism for tracing the dimensions of said any one of said frame, said pattern and said lens as said any one of said frame, said pattern and said lens is moved by said motor, and
a data generator for generating data corresponding to the dimensions of said any one of said frame, said pattern and said lens as the dimensions of said any one of said frame, said pattern and said lens are traced by said tracing mechanism during movement of said any one of said frame, said pattern and said lens by said motor; and
wherein said storing means comprises a storing sub-system, said storing sub-system comprising a translation section for translating data from point-contact data to wheel form data, or vice-versa, and a data storage section for storing said data converted by said translation section;
said system further comprising interface means between said tracing sub-system and said storing sub-system for conveying data in at least one direction between said tracing sub-system and said storing sub-system;
whereby said tracing sub-system and said storing sub-system are able to operate independently or to operate, via said interface means, in a related manner.

11. A computerized edging system for the automated edging of an ophthalmic lens, comprising:
tracing means for performing a tracing operation with respect to any one of a frame, a pattern and a lens to derive data relating to the dimensions thereof,
storing means for storing said data relating to the dimensions of said any one of said frame, said pattern and said lens,
accessing means for accessing said storing means so as to read out said data relating to the dimensions of said any one of said frame, said pattern and said lens,
processing means for processing said data read from said storing means by said accessing means so as derive control signals for the edging of said ophthalmic lens, and
edging means responsive to said control signals from said processing means for edging said ophthalmic lens so as to provide said ophthalmic lens with dimensions corresponding to the dimensions of said any one of said frame, said pattern and said lens;
wherein said storing means comprises a storing sub-system connected to said tracing means for receiving said data relating to the dimensions of said any one of said frame, said pattern and said lens; and
wherein said tracing means includes a wheel follower having a first periphery and a second periphery for performing the tracing operation, the data derived from tracing with the first periphery comprising point-contact data, and the data derived from tracing with the second periphery comprising wheel form data; and
wherein said storing sub-system comprises a translation section for translating said data relating to the dimensions of said any one of said frame, said pattern and said lens from point-contact data to wheel form of data or vice-versa.

12. The system of claim 11, wherein said storing sub-system includes a storage section connected to said translation section, said storage section storing said data relating to the dimensions of said any one of said frame, said pattern and said lens after said data relating to the dimensions of said any one of said frame, said pattern and said lens are converted from said one form of data to said another form of data.

13. A computerized edging system for the automated edging of an ophthalmic lens, comprising:
tracing means for performing a tracing operation with respect to any one of a frame, a pattern and a lens to derive data relating to the dimensions thereof,
storing means for storing said data relating to the dimensions of said any one of said frame, said pattern and said lens,
accessing means for accessing said storing means so as to read out said data relating to the dimensions of said any one of said frame, said pattern and said lens,
processing means for processing said data read from said storing means by said accessing means so as derive control signals for the edging of said ophthalmic lens, and
edging means responsive to said control signals from said processing means for edging said ophthalmic lens so as to provide said ophthalmic lens with dimensions corresponding to the dimensions of said any one of said frame, said pattern and said lens;
wherein said processing means comprises an edging processor, said data read from said storing means by said accessing means comprising digital data, said processing means further comprising a digital-to-analog converter, said edging processor receiving said digital data and providing said digital data to said digital-to-analog converter, said digital-to-analog converter converting said digital data to analog signals, said processing means further comprising a control arrangement, said digital-to-analog converter providing said analog signals to said control arrangement, said control arrangement being responsive to said analog signals for generating said control signals for the edging of said ophthalmic lens; and
wherein said edging means comprises a servo motor, said control arrangement providing said control signals for the edging of said ophthalmic lens to said servo motor, said servo motor being responsive to said control signals from said control arrangement for producing motor drive signals, said edging means further comprising a spindle motor and a grinding mechanism, said spindle motor being responsive to said motor drive signals for producing relative motion between said ophthalmic lens and said grinding mechanism so as to edge said ophthalmic lens and to provide said ophthalmic lens with dimensions corresponding to the dimensions of said any one of said frame, said pattern and said lens.

14. The system of claim 13, wherein said control arrangement comprises an analog amplifier arrangement.

15. A computerized tracing system for performing a tracing operation with respect to any one of a frame, a pattern and a lens, said system comprising;

- a frame holder for holding said frame in a tracing position, said frame having a generally loop-like structure defining a frame plane,
- a stylus disposed in said frame plane and inside of said loop-like structure so that said loop-like structure surrounds said stylus, said stylus extending toward said frame so that a distal end of said stylus contacts said frame,
- an additional holder for holding any one of said pattern and said lens in a tracing position, said any one of said pattern and said lens having a generally flat structure defining a given plane,
- a wheel follower disposed in said given plane and movable into a position adjacent said any one of said pattern and said lens so that a peripheral portion of said wheel follower contacts said any one of said pattern and said lens,
- moving means for creating relative rotational movement of said frame with respect to said stylus when said frame is held by said frame holder so that said stylus contacts said frame at successive points along the loop-like structure of said frame, and for producing relative motion between said additional holder and said wheel follower when said any one of said pattern and said lens is held by said additional holder so that the peripheral portion of said wheel follower contacts said any one of said pattern and said lens at successive points along a periphery of said any one of said pattern and said lens, and
- a tracing processor for generating tracing control signals to control said tracing operation, said moving means being responsive to said tracing control signals for providing relative movement of said any one of said frame, said pattern and said lens,
- whereby said loop-like structure of said frame is effectively traced by said stylus when said frame is held by said frame holder, and the periphery of said any one of said pattern and said lens is effectively traced by said wheel follower when said any one of said pattern and said lens is held by said additional holder;
- wherein said stylus has a pivot end remote from said distal end, said pivot end being located at a base position prior to relative motion of said frame with respect to said stylus, and wherein the position of said pivot end of said stylus varies from said base position during relative motion of said frame with respect to said stylus, and wherein the position of said pivot end of said stylus varies from said base position in accordance with the dimensions of said loop-like structure of said frame as said loop-like structure of said frame is traced by said stylus, said tracing system comprising potentiometer means operatively associated with said stylus and responsive to the position of said pivot end of said stylus for generating an electric signal which varies in accordance with variation of the position of said pivot end of said stylus from said base position, the electrical signal being provided to said tracing processor.

16. A computerized tracing system for performing a tracing operation with respect to any one of a frame, a pattern and a lens, said system comprising:

- a frame holder for holding said frame in a tracing position, said frame having a generally loop-like structure defining a frame plane,
- a stylus disposed in said frame plane and inside of said loop-like structure so that said loop-like structure surrounds said stylus, said stylus extending toward said frame so that a distal end of said stylus contacts said frame,
- an additional holder for holding any one of said pattern and said lens in a tracing position, said any one of said pattern and said lens having a generally flat structure defining a given plane,
- a wheel follower disposed in said given plane and movable into a position adjacent said any one of said pattern and said lens so that a peripheral portion of said wheel follower contacts said any one of said pattern and said lens,
- moving means for creating relative rotational movement of said frame with respect to said stylus when said frame is held by said frame holder so that said stylus contacts said frame at successive points along the loop-like structure of said frame, and for producing relative motion between said additional holder and said wheel follower when said any one of said pattern and said lens is held by said additional holder so that the peripheral portion of said wheel follower contacts said any one of said pattern and said lens at successive points along a periphery of said any one of said pattern and said lens, and
- a tracing processor for generating tracing control signals to control said tracing operation, said moving means being responsive to said tracing control signals for providing relative movement of said any one of said frame, said pattern and said lens,
- whereby said loop-like structure of said frame is effectively traced by said stylus when said frame is held by said frame holder, and the periphery of said any one of said pattern and said lens is effectively traced by said wheel follower when said any one of said pattern and said lens is held by said additional holder;
- wherein said stylus has a pivot end remote from said distal end, and said moving means comprises a motor which imparts rotational motion to said frame holder so as to rotate the loop-like structure of said frame around said stylus, whereby to create a relative tracing movement of said stylus with respect to said loop-like structure of said frame; and
- wherein the pivot end of said stylus is connected to one end of a stylus post, said stylus post extending away from the pivot end of said stylus in a direction generally perpendicular to the frame plane, said stylus post having another end remote from said one end, said another end of said stylus post being connected to a swingframe oriented in a plane generally parallel to said frame plane, and wherein the position of said pivot end of said stylus varies from a base position in accordance with the dimensions of said loop-like structure of said frame as said loop-like structure of said frame is traced by said stylus;
- said tracing system including a potentiometer mounted on a framework of said system and a slider mounted on said swingframe of said system, and wherein movement of said pivot end of said stylus from said base position translates into movement of said slider relative to said potentiometer, said potentiometer generating an electrical signal which varies in accordance with variation of the position of said pivot end of said stylus from said base position as said stylus traces the loop-like structure of said frame, the electrical signal being provided to said tracing processor.

17. A computerized tracing system for performing a tracing operation wtih respect to any one of a frame, a pattern and a lens, said system comprising:
   a frame holder for holding said frame in a tracing position, said frame having a generally loop-like structure defining a frame plane,
   a stylus disposed in said frame plane and inside of said loop-like structure so that said loop-like structure surrounds said stylus, said stylus extending toward said frame so that a distal end of said stylus contacts said frame,
   an additional holder for holding any one of said pattern and said lens in a tracing position, said any one of said pattern and said lens having a generally flat structure defining a given plane,
   a wheel follower disposed in said given plane and movable into a position adjacent said any one of said pattern and said lens so that a peripheral portion of said wheel follower contacts said any one of said pattern and said lens,
   moving means for creating relative rotational movement of said frame with respect to said stylus when said frame is held by said frame holder so that said stylus contacts said frame at successive points along the loop-like structure of said frame, and for producing relative motion between said additional holder and said wheel follower when said any one of said pattern and said lens is held by said additional holder so that the peripheral portion of said wheel follower contacts said any one of said pattern and said lens at successive points along a periphery of said any one of said pattern and said lens, and
   a tracing processor for generating tracing control signals to control said tracing operation, said moving means being responsive to said tracing control signals for providing relative movement of said any one of said frame, said pattern and said lens,
   whereby said loop-like structure of said frame is effectively traced by said stylus when said frame is held by said frame holder, and the periphery of said any one of said pattern and said lens is effectively traced by said wheel follower when said any one of said pattern and said lens is held by said additional holder;
   wherein said any one of said pattern and said lens is rotated by said moving means when said any one of said pattern and said lens is held by said additional holder, said wheel follower being located at a base position at commencement of rotation of said any one of said pattern and said lens, and wherein the position of said wheel follower varies from said base position during rotation of said any one of said pattern and said lens, and wherein the position of said wheel follower varies from said base position in accordance with the dimensions of said any one of said pattern and said lens as the periphery of said any one of said pattern and said lens is traced by said wheel follower;
   said tracing system comprising potentiometer means operatively associated with said wheel follower and responsive to the position of said wheel follower for generating an electrical signal which varies in accordance with variation of the position of said wheel follower from said base position, the electrical signal being provided to said tracing processor.

18. A computerized tracing system for performing a tracing operation with respect to any one of a frame, a pattern and a lens, said system comprising:
   a frame holder for holding said frame in a tracing position, said frame having a generally loop-like structure defining a frame plane,
   a stylus disposed in said frame plane and inside of said loop-like structure so that said loop-like structure surrounds said stylus, said stylus extending toward said frame so that a distal end of said stylus contacts said frame,
   an additional holder for holding any one of said pattern and said lens in a tracing position, said any one of said pattern and said lens having a generally flat structure defining a given plane,
   a wheel follower disposed in said given plane and movable into a position adjacent said any one of said pattern and said lens so that a peripheral portion of said wheel follower contacts said any one of said pattern and said lens,
   moving means for creating relative rotational movement of said frame with respect to said stylus when said frame is held by said frame holder so that said stylus contacts said frame at successive points along the loop-like structure of said frame, and for producing relative motion between said additional holder and said wheel follower when said any one of said pattern and said lens is held by said additional holder so that the peripheral portion of said wheel follower contacts said any one of said pattern and said lens at successive points along a periphery of said any one of said pattern and said lens, and
   a tracing processor for generating tracing control signals to control said tracing operation, said moving means being responsive to said tracing control signals for providing relative movement of said any one of said frame, said pattern and said lens,
   whereby said loop-like structure of said frame is effectively traced by said stylus when said frame is held by said frame holder, and the periphery of said any one of said pattern and said lens is effectively traced by said wheel follower when said any one of said pattern and said lens is held by said additional holder;
   wherein said moving means comprises a motor which rotates said any one of said pattern and said lens as disposed on said additional holder, whereby to create a relative tracing movement of said wheel follower with respect to said any one of said pattern and said lens; and
   wherein said tracing system includes a wheel follower axle connected to said wheel follower at a center point of said wheel follower, said wheel follower axle extending from said wheel follower in a direction generally perpendicular to said given plane, said wheel follower axle having a remote end remote from said wheel follower, said remote end of said wheel follower axle being connected to a swingframe oriented in a plane generally parallel to said given plane, and wherein the position of said wheel follower varies from a base position in accordance with the dimensions of said any one of said pattern and said lens as said any one of said pattern and said lens is traced by said wheel follower;

said tracing system including a potentiometer mounted on a framework of said system and a slider mounted on said swingframe of said system, and wherein movement of said wheel follower from said base position translates into movement of said slider relative to said potentiometer, said potentiometer generating an electrical signal which varies in accordance with variation of the position of said wheel follower from said base position as said wheel follower traces said any one of said pattern and said lens, the electrical signal being provided to said tracing processor.

19. The frame tracing system for performing a tracing operation with respect to a frame, said system comprising:

frame holder means for holding said frame in a tracing position, said frame having a generally loop-like structure defining a frame plane, stylus means disposed in said frame plane and inside of said loop-like structure so that said loop-like structure surrounds said stylus means, said stylus means extending toward said frame so that a distal end of said stylus means contacts said frame, and moving means for creating relative rotational movement of said frame with respect to said stylus means so that said stylus means contacts said frame at successive points along the loop-like structure of said frame, said stylus means thereby effectively tracing the loop-like structure of said frame;

wherein said stylus means has a pivot end remote from said distal end, said pivot end being located at a base position prior to relative motion of said frame with respect to said stylus means, and wherein the position of said pivot end of said stylus means varies from said base position during relative motion of said frame with respect to said stylus means, the position of said pivot said of said stylus means varying from said base position in accordance with the dimensions of said loop-like structure of said frame as said loop-like structure of said frame is traced by said stylus means;

said system further comprising a tracing processor and potentiometer means operatively associated with said stylus means and responsive to the position of said pivot end of said stylus means for generating an electrical signal which varies in accordance with variation of the position of said pivot end of said stylus means from said base position; and wherein the pivot end of said stylus means is connected to one end of a stylus post, said stylus post extending away from the pivot end of said stylus means in a direction generally perpendicular to the frame plane, said stylus post having another end remote from said one end, said another end of said stylus post being connected to a swingframe oriented in a plane generally parallel to said frame plane; and wherein said potentiometer means comprises a potentiometer mounted on a framework of said system and a slider mounted on said swingframe of said system, and wherein movement of said pivot end of said stylus means from said base position translates into movement of said slider relative to said potentiometer, said potentiometer generating said electrical signal which varies in accordance with variation of the position of said pivot end of said stylus means from said base position as said stylus means traces the loop-like structure of said frame, the electrical signal being provided to said tracing processor.

20. The system of claim 19, wherein said moving means comprises a motor which imparts rotational motion to said frame holder means so as to rotate the loop-like structure of said frame around said stylus means, whereby to create a relative tracing movement of said stylus means with respect to said loop-like structure of said frame.

21. The system of claim 19 wherein said tracing processor generates tracing control signals to control said tracing operation, said moving means being responsive to said tracing control signals for moving said frame.

22. The system of claim 21, further comprising data generator means for generating data corresponding to the dimensions of said frame as the dimensions of said frame are traced by said stylus means during movement of said frame by said moving means.

23. The system of claim 20, generates tracing processor means for generating tracing control signals to control said tracing operation, said motor being responsive to said tracing control signals for moving said frame.

24. The system of claim 23, further comprising data generator means for generating data corresponding to the dimensions of said frame as the dimensions of said frame are traced during movement of said frame.

25. A tracing system for performing a tracing operation with respect to any one of a pattern and a lens, said system comprising:

holder means for holding said any one of said pattern and said lens in a tracing position, said any one of said pattern and said lens having a generally flat structure defining a given plane, wheel follower means disposed in said given plane and movable into a position adjacent said any one of said pattern and said lens so that a peripheral portion of said wheel follower means contacts said any one of said pattern and said lens, and moving means for producing relative motion between said holder means and said wheel follower means so that the peripheral portion of said wheel follower means contacts said any one of said pattern and said lens at successive points along a periphery of said any one of said pattern and said lens, the periphery of said any one of said pattern and said lens being thereby effectively traced by said wheel follower means;

wherein said any one of said pattern and said lens is rotated by said moving means, said wheel follower means being located at a base position at commencement of rotation of said any one of said pattern and said lens, and wherein the position of said wheel follower means varies from said base position during rotation of said any one of said pattern and said lens, the position of said wheel follower means varying from said base position in accordance wtih the dimensions of said any one of said pattern and said lens as the periphery of said any one of said pattern and said lens is traced by said wheel follower means;

said tracing system further comprising a tracing processor and potentiometer means operatively associated with said wheel follower means and responsive to the position of said wheel follower means for generating a signal which varies in accordance with variation of the position of said wheel follower means from said base position;

said system further comprising a wheel follower axle connected to said wheel follower means at a center point of said wheel follower means, said wheel follower axle extending from said wheel follower means in a direction generally perpendicular to said given plane, said wheel follower axle having a remote end remote from said wheel follower means, said remote end of said wheel follower axle being connected to a swingframe oriented in a plane generally parallel to said given plane;

said potentiometer means comprising a potentiometer mounted on a framework of said system and a slider mounted on said swingframe of said system, and wherein movement of said wheel follower means from said base position translates into movement of said slider relative to said potentiometer, said potentiometer generating an electrical signal which varies in accordance with variation of the position of said wheel follower means from said base position as said wheel follower means traces said any one of said pattern and said lens, the electrical signal being provided to said tracing processor.

26. The system of claim 25, wherein said moving means comprises a motor which rotates said any one of said pattern and said lens as disposed on said holder means, whereby to create a relative tracing movement of said wheel follower with respect to said any one of said pattern and said lens.

27. The system of claim 26 wherein said tracing processor generates tracing control signals to control said tracing operation, said motor being responsive to said tracing control signals for moving said any one of said pattern and said lens.

28. The system of claim 27, further comprising data generator means for generating data corresponding to the dimensions of said any one of said pattern and said lens as the dimensions of said any one of said pattern and said lens are traced during movement of said any one of said pattern and said lens.

29. The system of claim 25, wherein said tracing processor generates tracing control signals to control said tracing operation, said moving means being responsive to said tracing control signals for moving said any one of said pattern and said lens.

30. The system of claim 29, further comprising data generator means for generating data corresponding to the dimensions of said any one of said pattern and said lens as the dimensions of said any one of said pattern and said lens are traced by said wheel follower means during movement of said any one of said pattern and said lens by said moving means.

31. A computerized edging system for the automated edging of an ophthalmic lens, comprising:
tracing means for performing a tracing operation with respect to a pattern to derive data relating to the dimensions thereof;
storing means for storing said data relating to the dimensions of said pattern;
accessing means for accessing said storing means so as to read out said data relating to the dimensions of said pattern;
processing means for processing said data read from said storing means by said accessing means so as to derive control signals for the edging of said ophthalmic lens; and
edging means responsive to said control signals from said processing means for edging said ophthalmic lens so as to provide said ophthalmic lens with dimensions corresponding to the dimensions of said pattern;
wherein said edging means comprises a servo motor, said processing means comprising a control arrangement providing said control signals to said servo motor, said servo motor being responsive to said control signals for producing motor drive signals, said processing means further comprising a feedback potentiometer operatively associated with said servo motor for monitoring the operation of said servo motor for the purpose of servo-controlling said servo motor.

32. The system of claim 31, wherein said processing means comprises an edging processor, said data read from said storing means by said accessing means comprising digital data, said processing means further comprising a digital-to-analog converter, said edging processor providing said digital data to said digital-to-analog converter, said digital-to-analog converter converting said digital data to analog signals, said digital-to-analog converter providing said analog signals to said control arrangement, said control arrangement being responsive to said analog signals for generating said control signals for the edging of said ophthalmic lens.

33. The system of claim 32, said feedback potentiometer developing a feedback signal, said processing means further comprising a summer connected to said feedback potentiometer for receiving said feedback signal and for summing said feedback signal with an offset voltage, said summer developing a servo-control signal, said control arrangement comprising an analog amplifier for receiving and processing said analog signals form said digital-to-analog converter and said servo-control signal from said summer to derive said control signals for provision to said servo motor.

34. A computerized edging system of the automated edging of an ophthalmic lens, comprising:
tracing means for performing a tracing operation with respect to a pattern to derive data relating to the dimensions thereof,
storing means for storing said data relating to the dimensions of said pattern,
accessing means for accessing said storing means so as to read out said data relating to the dimensions of said pattern,
processing means for processing said data read from said storing means by said accessing means so as to derive control signals for the edging of said ophthalmic lens, and
edging means responsive to said control signals from said processing means for edging said ophthalmic lens so as to provide said ophthalmic lens with dimensions corresponding to the dimensions of said pattern;
wherein said edging means comprises a servo motor, said processing means comprising a control arrangement providing said control signals to said servo motor, said servo motor being responsive to said control signals from said control arrangement for producing motor drive signals, said edging means further comprising a spindle motor and a grinding mechanism, said spindle motor being responsive to said motor drive signals for producing relative motion between said ophthalmic lens and said grinding mechanism so as to edge said ophthalmic lens and to provide said ophthalmic lens with dimensions corresponding to the dimensions of said pattern.

35. The system of any one of claims 31, 32 or 34, further comprising digitizing means for digitizing said data derived by said tracing means to produce digital data;
wherein said data stored by said storing means, accessed by said accessing means and processed by said processing means comprises said digital data.

36. The system of claim 34, wherein said ophthalmic lens is carried by a spindle, said system further comprising an encoder operatively associated with said spindle for detecting the rotational position of said spindle during the production of relative motion between said ophthalmic lens and said grinding mechanism, and for producing encoder output signals corresponding to the rotational position of said spindle, said encoder providing said encoder output signals to said edging processor.

37. The system of any one of claims 32 or 34, wherein said control arrangement comprises an analog amplifier arrangement.

38. The system of claim 1, wherein said edging means comprises an edging sub-system responsive to said control signals from said processing means for edging the ophthalmic lens;
said system comprising additional interface means between said storing sub-system and said processing means for conveying data in at least one direction between said storing sub-system and said processing means;
whereby said storing sub-system and said edging sub-system are able to operate independently or to operate, via said additional interface means and said processing means, in a related manner.

39. A computerized multi-processor tracing and edging system for the automated edging of an ophthalmic lens, comprising:
tracing means for providing a tracing operation with respect to any one of a frame, a pattern and a lens to derive data relating to the dimensions thereof;
storing means for storing said data relating to the dimensions of said any one of said frame, said pattern and said lens;
accessing means for accessing said storing means so as to read out said data relating to the dimensions of said any one of said frame, said pattern and said lens;
processing means for processing said data read from said storing means by said accessing means so as derive control signals for the edging of said ophthalmic lens; and
edging means responsive to said control signals from said processing means for edging said ophthalmic lens so as to provide said ophthalmic lens with dimensions corresponding to the dimensions of said any one of said frame, said pattern and said lens;
wherein said tracing means comprises a tracing sub-system, said tracing sub-system including a tracing processor for generating tracing control signals to control said tracing operation and for receiving data corresponding to the dimensions of said any one of said frame, said pattern and said lens as the dimensions of said any one of said frame, said pattern and said lens are traced during the tracing operation; and
wherein said edging means comprises an edging sub-system responsive to said control signals from said processing means for edging said ophthalmic lens;
said system further comprising interface means between said tracing sub-system and said processing means for conveying data in at least one direction between said tracing sub-system and said processing means;
whereby said tracing sub-system and said edging sub-system are able to operate independently or to operate, via said interface means and said processing means, in a related manner.

40. The system of any one of claims 1, 8, 10 or 39, further comprising additional interface means electrically connecting said processing means to said edging means for conveying said control signals electrically from said processing means to said edging means for automated edging of said ophthalmic lens.

41. The system of any one of claims 3 or 5, said tracing sub-system further comprising:
a motor responsive to said tracing control signals for moving said any one of said frame, said pattern and said lens;
a tracing mechanism for tracing the dimensions of said any one of said frame, said pattern and said lens as said any one of said frame, said pattern and said lens is moved by said motor; and
a data generator for generating data corresponding to the dimensions of said any one of said frame, said pattern and said lens as the dimensions of said any one of said frame, said pattern and said lens are traced by said tracing mechanism during movement of said any one of said frame, said pattern and said lens by said motor.

42. The system of any one of claims 3, 4, 5, 6, 11, 13, 31 or 34 further comprising interface means electrically connecting said processing means to said edging means for conveying said control signals electrically from said processing means to said edging means for automated edging of said ophthalmic lens.

43. The system of any one of claims 4, 6, 8 or 9, wherein said tracing means comprises a tracing sub-system, said tracing sub-system comprising:
a tracing processor for generating tracing control signals to control said tracing operation;
a motor responsive to said tracing control signals for moving said any one of said frame, said pattern and said lens;
a tracing mechanism for tracing the dimensions of said any one of said frame, said pattern and said lens as said any one of said frame, said pattern and said lens is moved by said motor; and
a data generator for generating data corresponding to the dimensions of said any one of said frame, said pattern and said lens as the dimensions of said any one of said frame, said pattern and said lens are traced by said tracing mechanism during movement of said any one of said frame, said pattern and said lens by said motor.

* * * * *